March 7, 1950 W. J. MILLER 2,499,602
APPARATUS FOR MANUFACTURING POTTERY WARE
Filed June 13, 1942 17 Sheets-Sheet 4
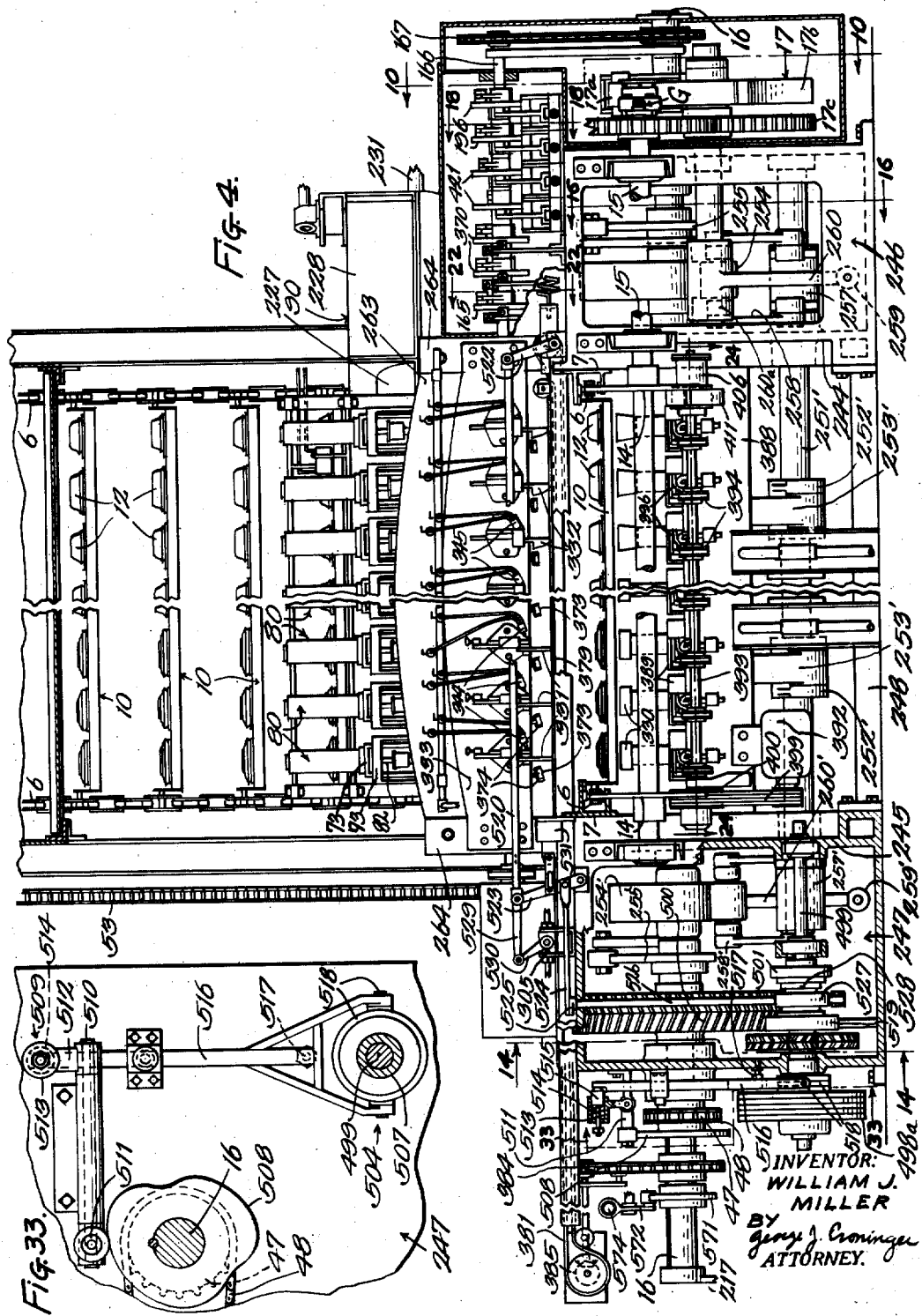
INVENTOR:
WILLIAM J. MILLER
BY George J. Croninger
ATTORNEY.

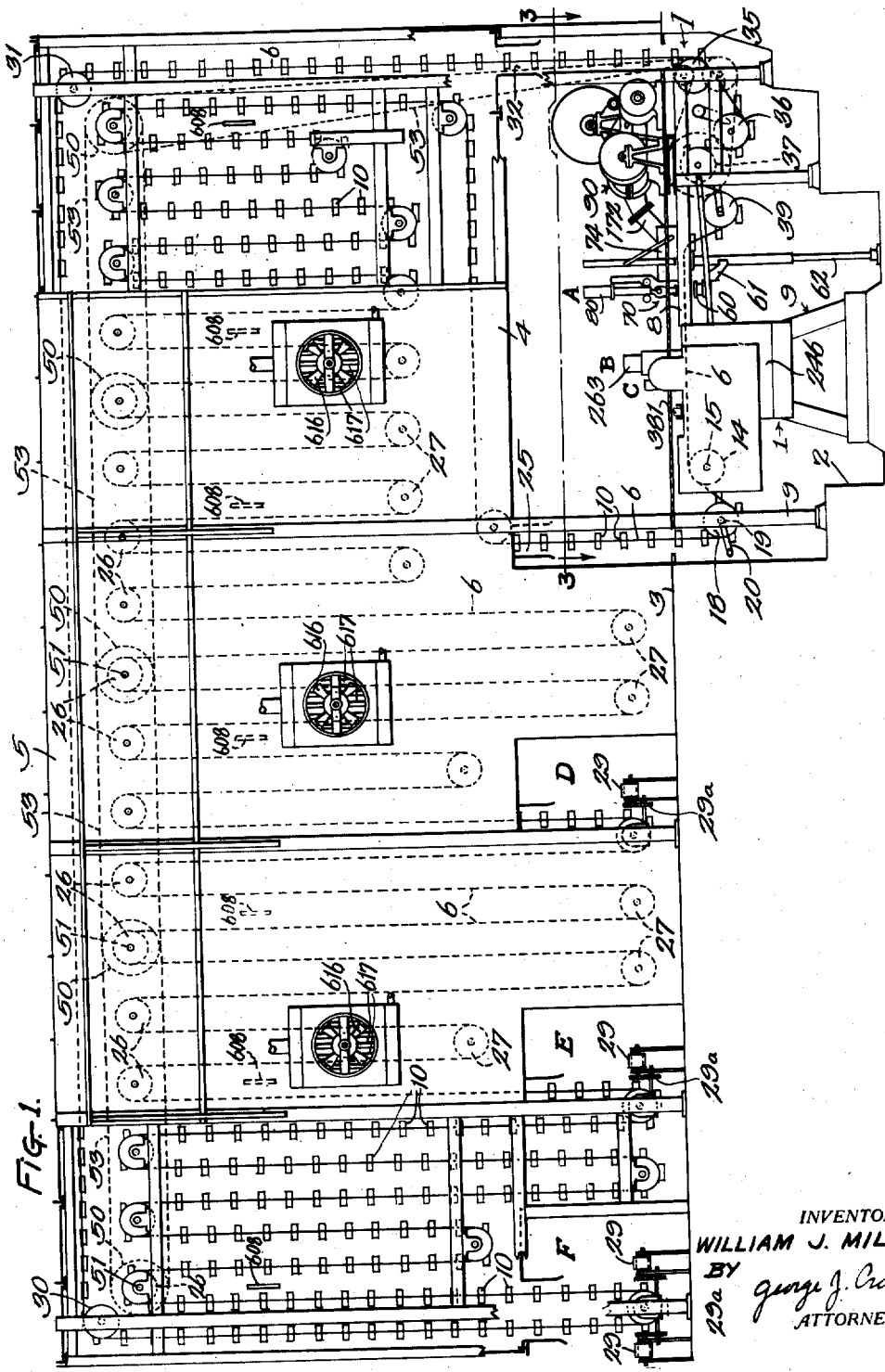

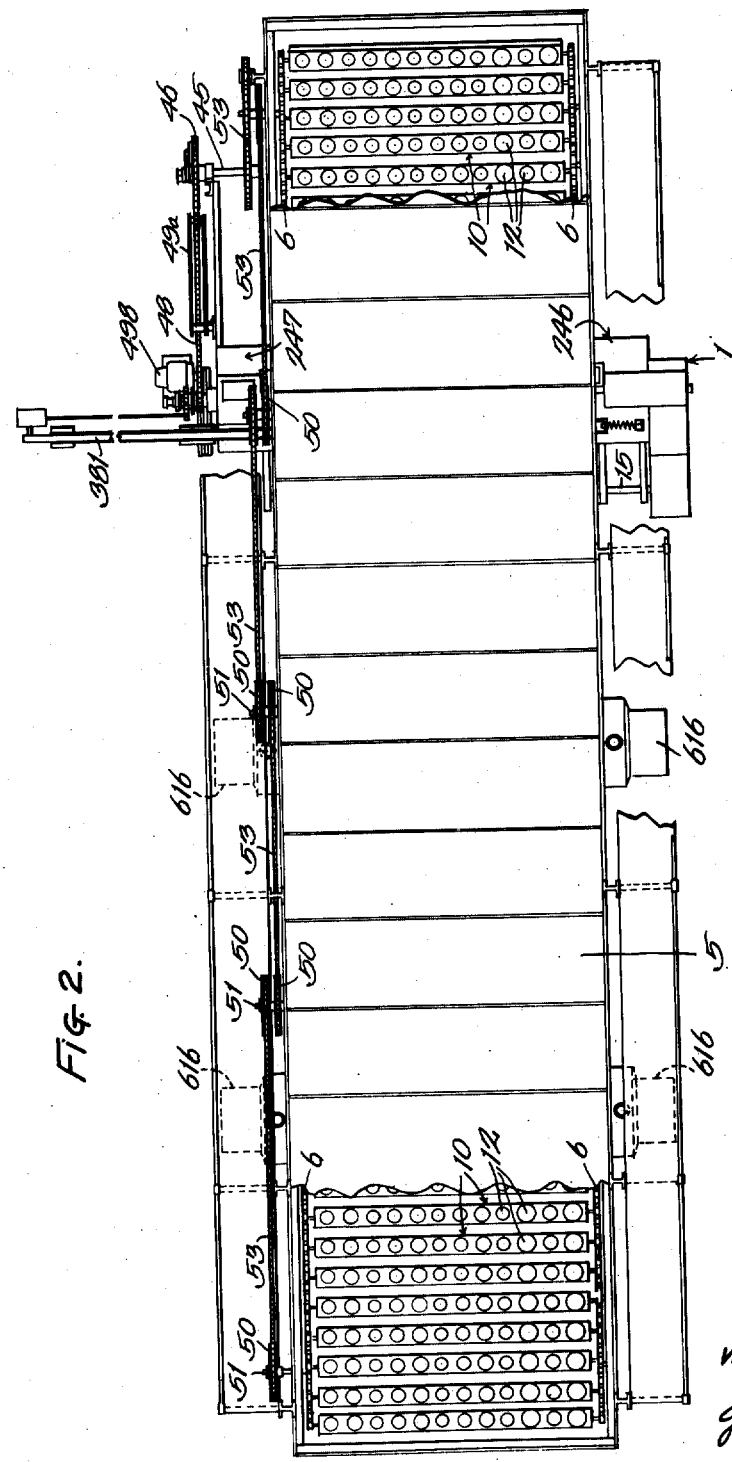

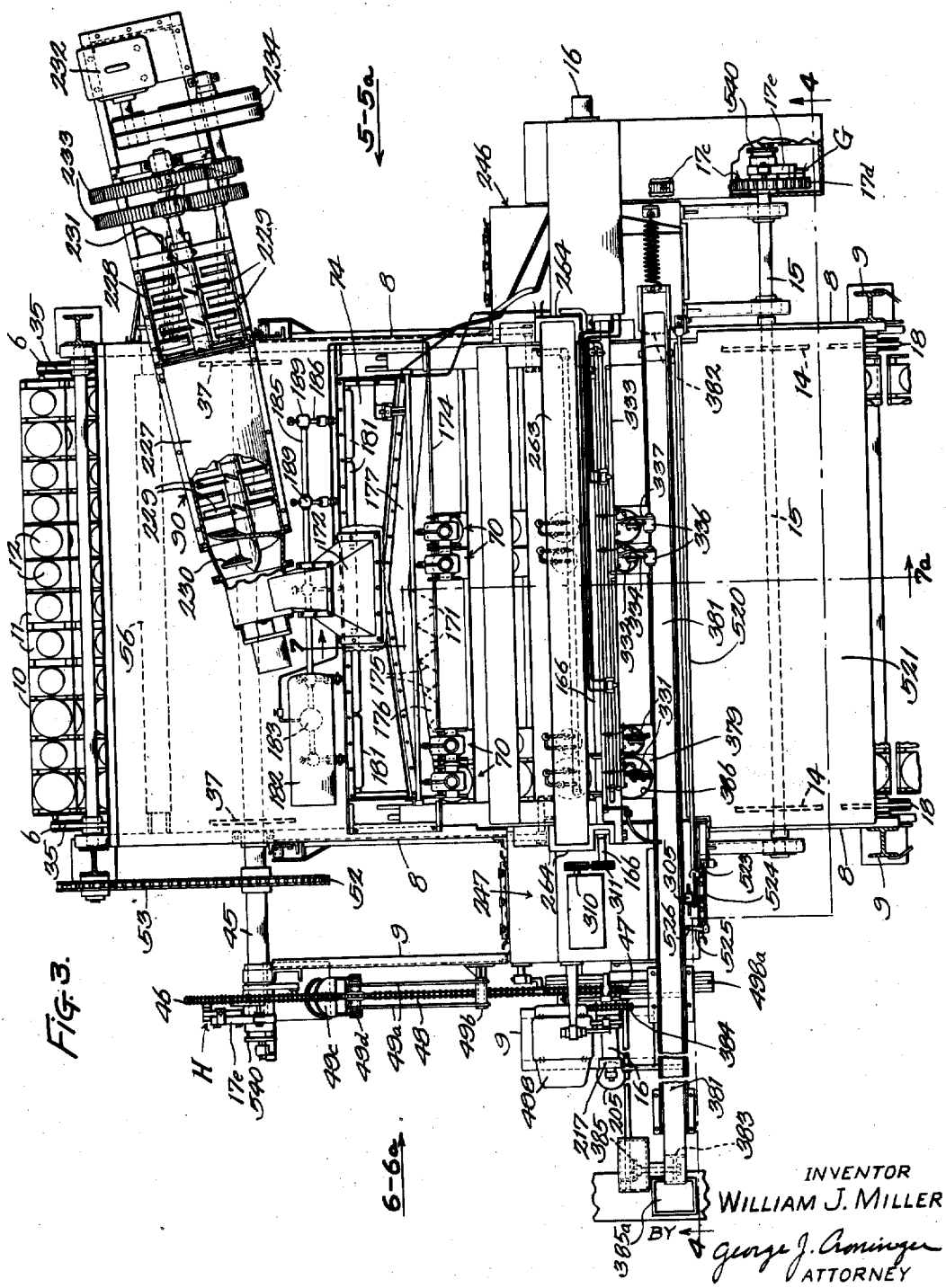

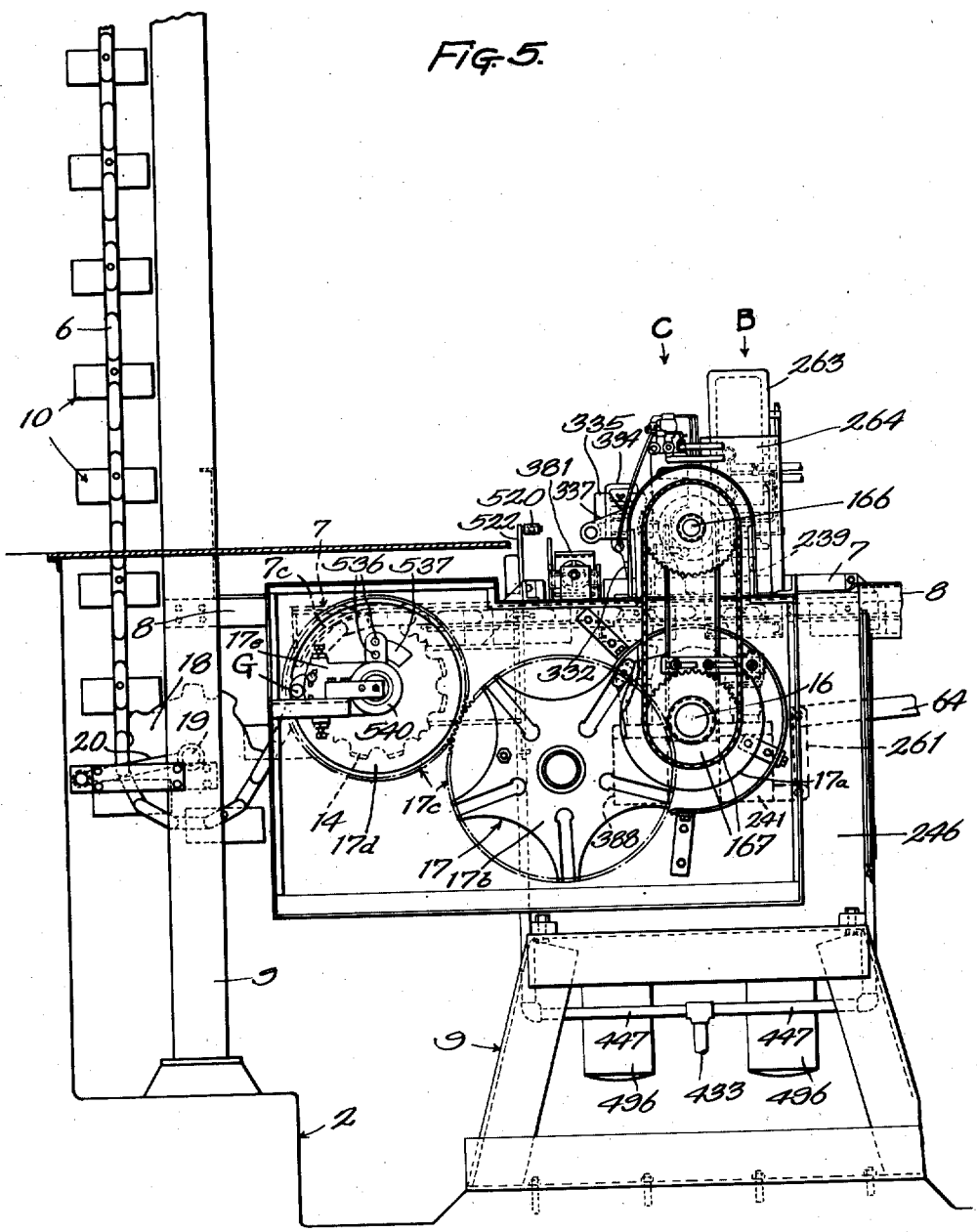

March 7, 1950 W. J. MILLER 2,499,602
APPARATUS FOR MANUFACTURING POTTERY WARE
Filed June 13, 1942 17 Sheets-Sheet 7
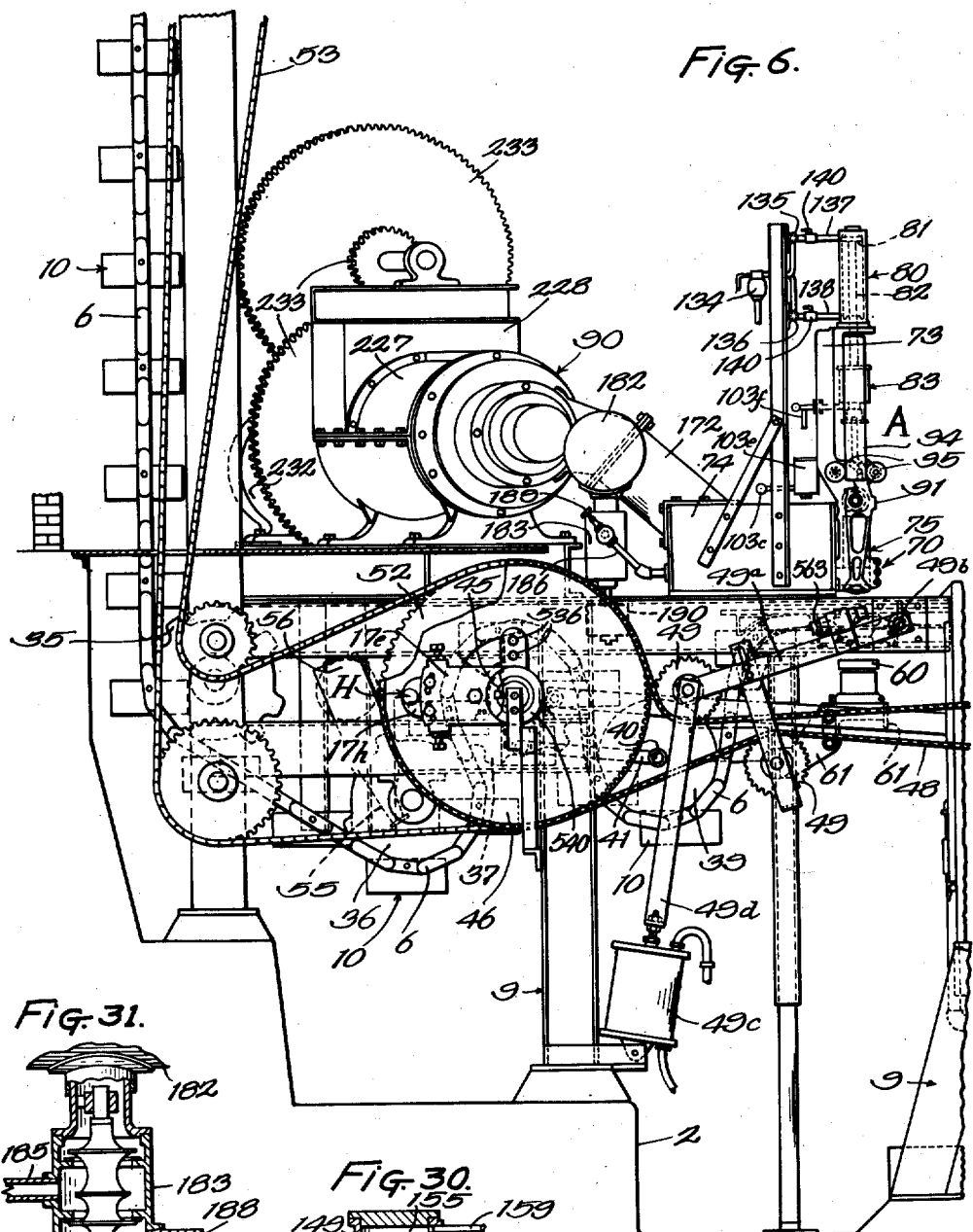
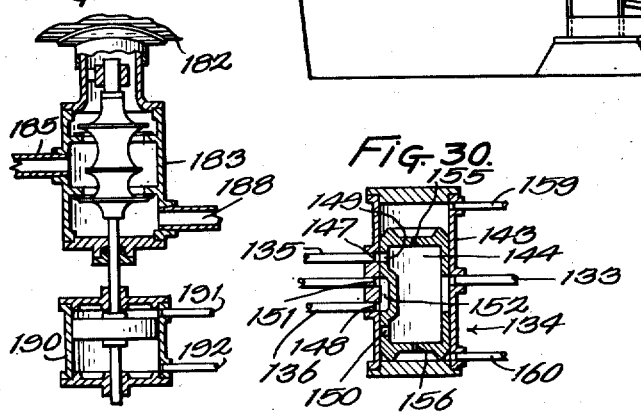
INVENTOR.
WILLIAM J. MILLER
BY George J. Crminger
ATTORNEY.

March 7, 1950  W. J. MILLER  2,499,602
APPARATUS FOR MANUFACTURING POTTERY WARE
Filed June 13, 1942  17 Sheets-Sheet 8

INVENTOR:
WILLIAM J. MILLER
BY George J. Croninger
ATTORNEY.

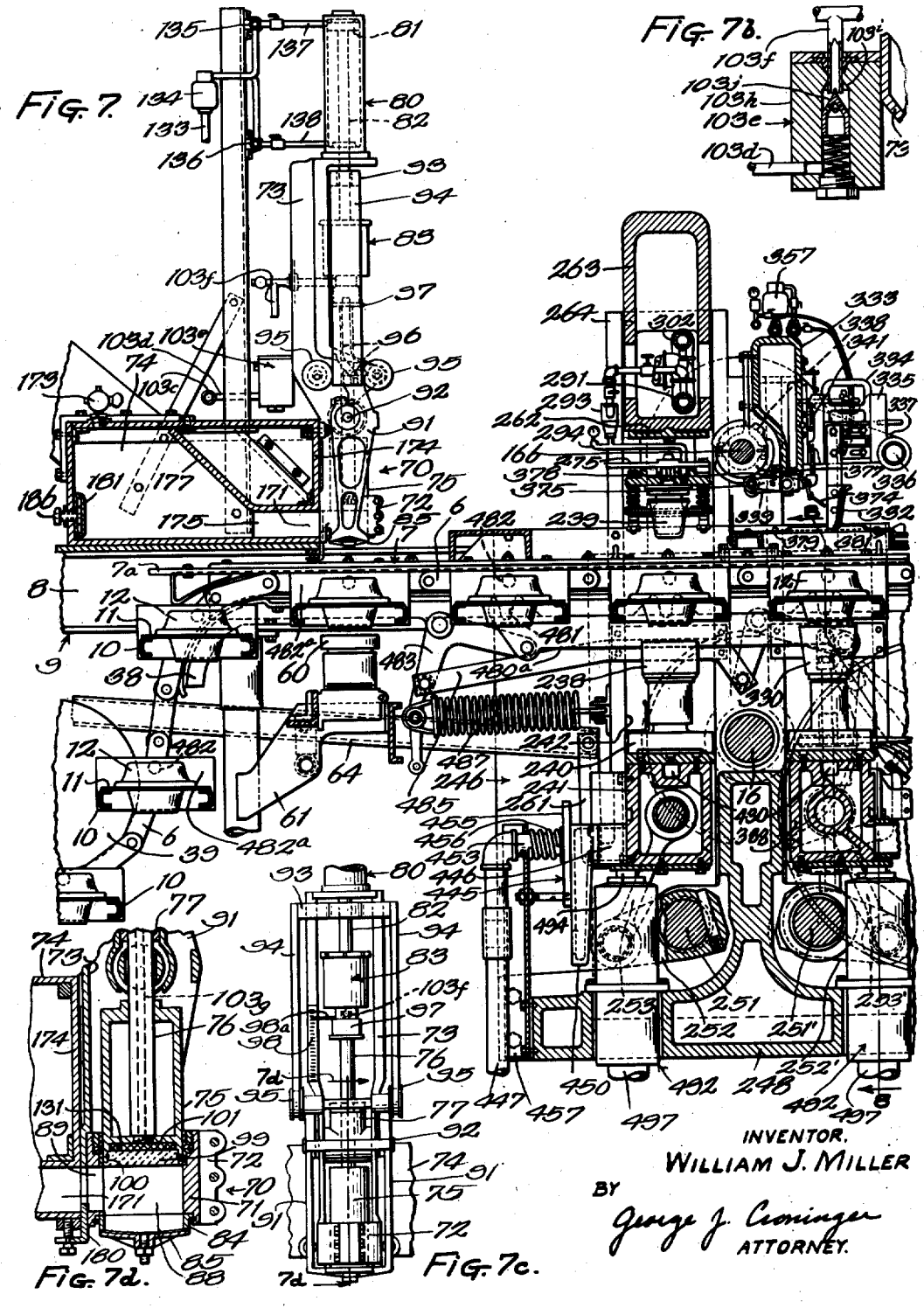

March 7, 1950 W. J. MILLER 2,499,602
APPARATUS FOR MANUFACTURING POTTERY WARE
Filed June 13, 1942 17 Sheets-Sheet 10

INVENTOR.
WILLIAM J. MILLER
BY
George J. Arminger
ATTORNEY.

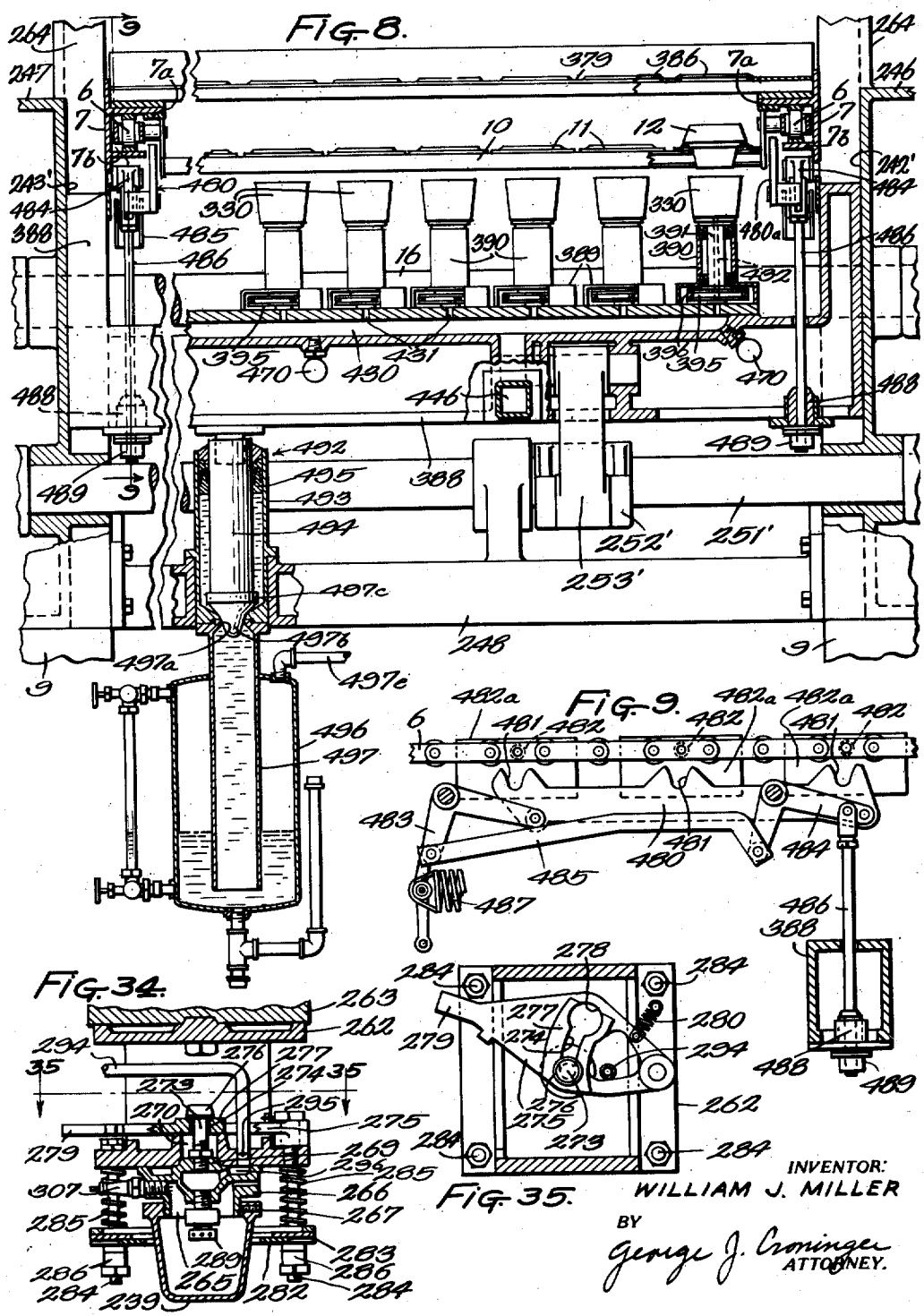

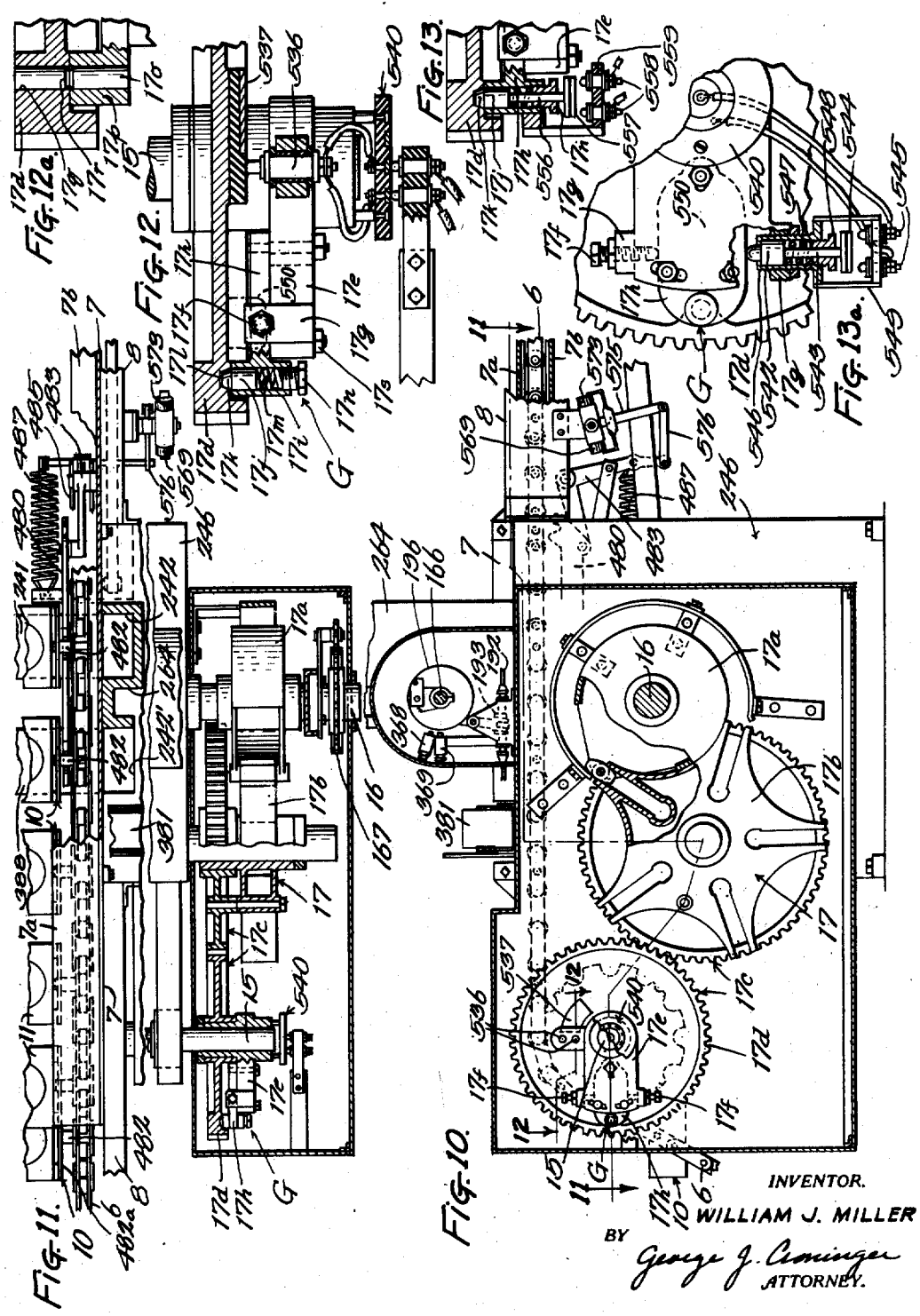

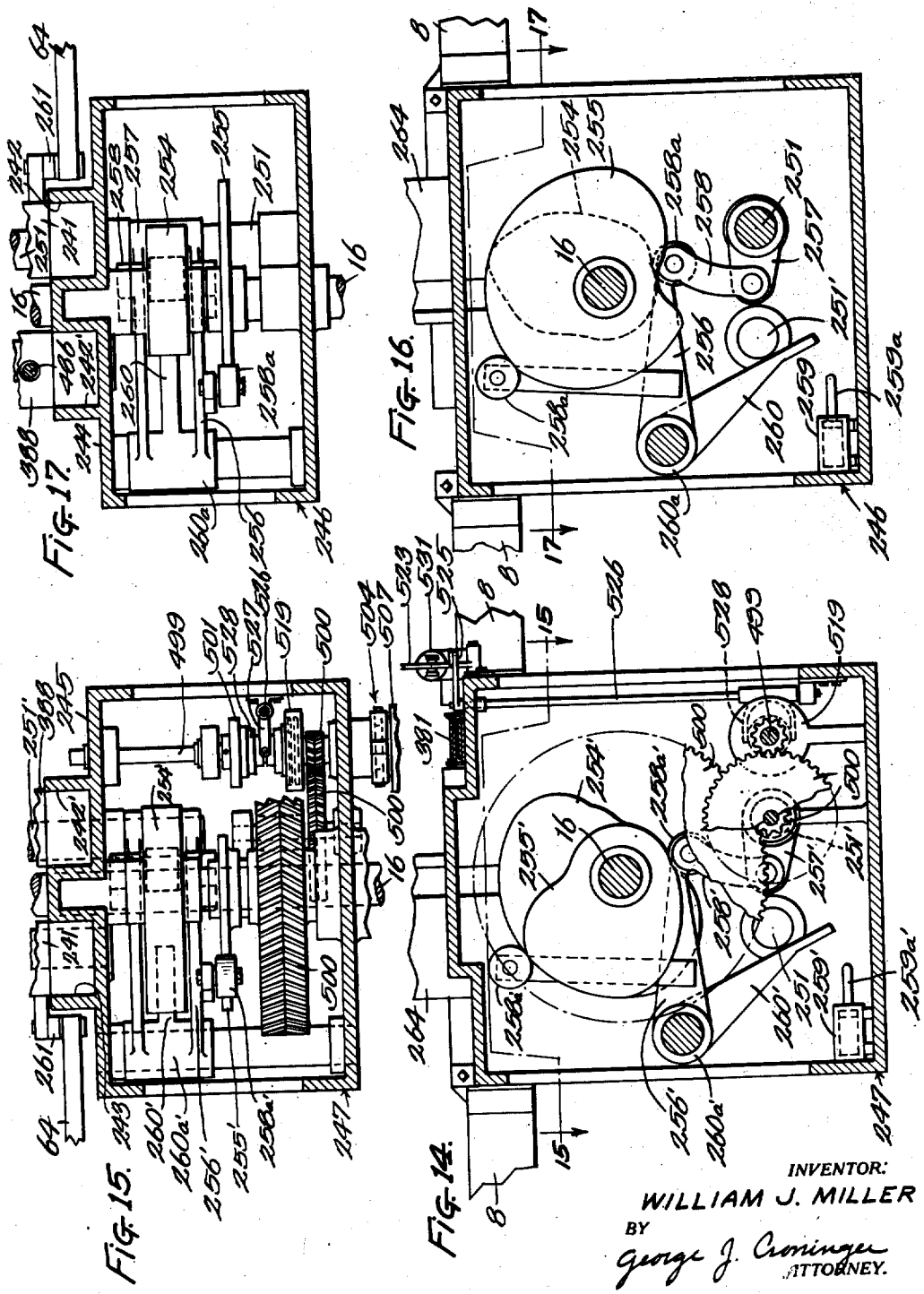

March 7, 1950  W. J. MILLER  2,499,602
APPARATUS FOR MANUFACTURING POTTERY WARE
Filed June 13, 1942  17 Sheets-Sheet 14
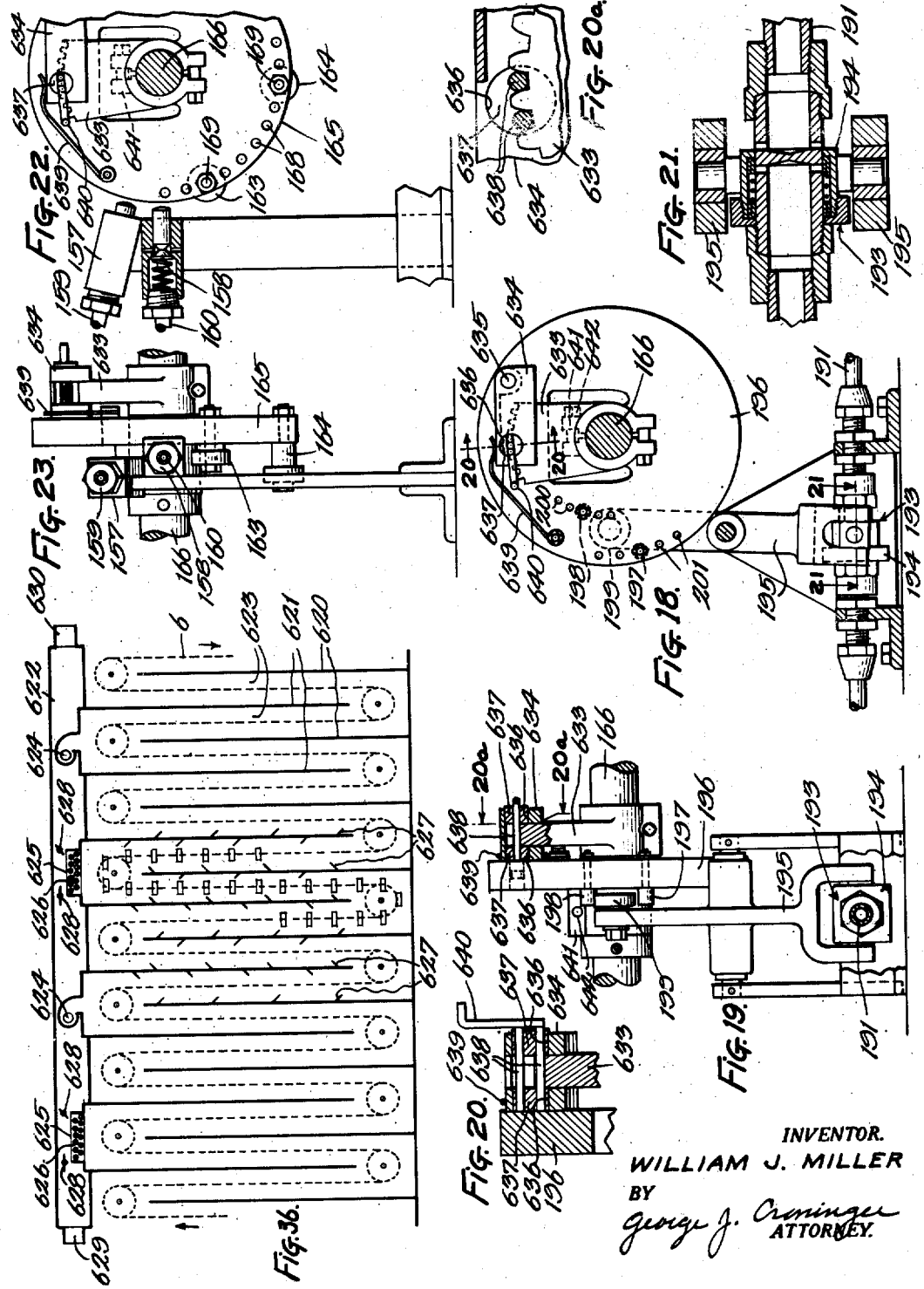
INVENTOR.
WILLIAM J. MILLER
BY
George J. Croninger
ATTORNEY.

March 7, 1950 W. J. MILLER 2,499,602
APPARATUS FOR MANUFACTURING POTTERY WARE
Filed June 13, 1942 17 Sheets-Sheet 15
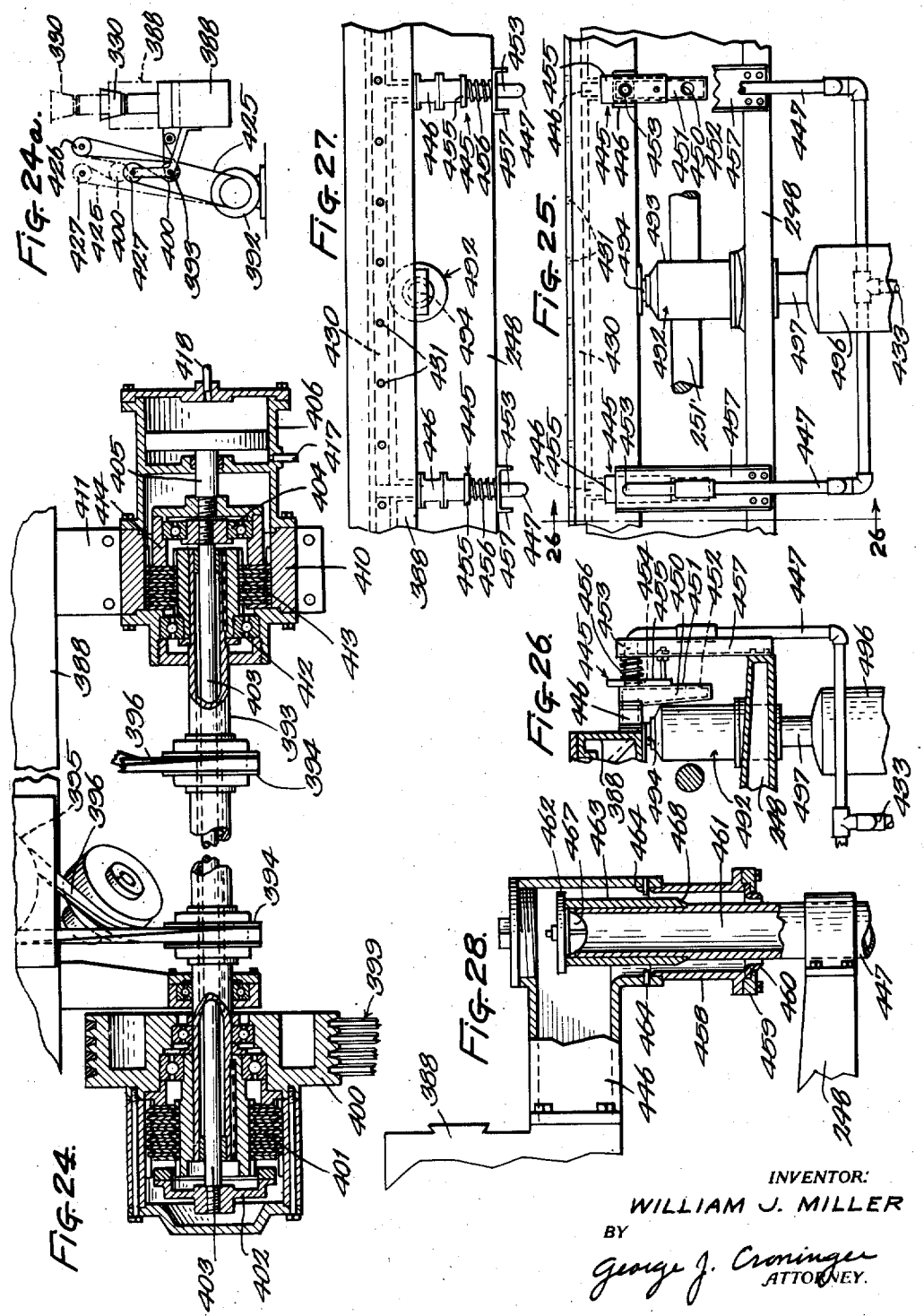
INVENTOR:
WILLIAM J. MILLER
BY
George J. Croninger
ATTORNEY.

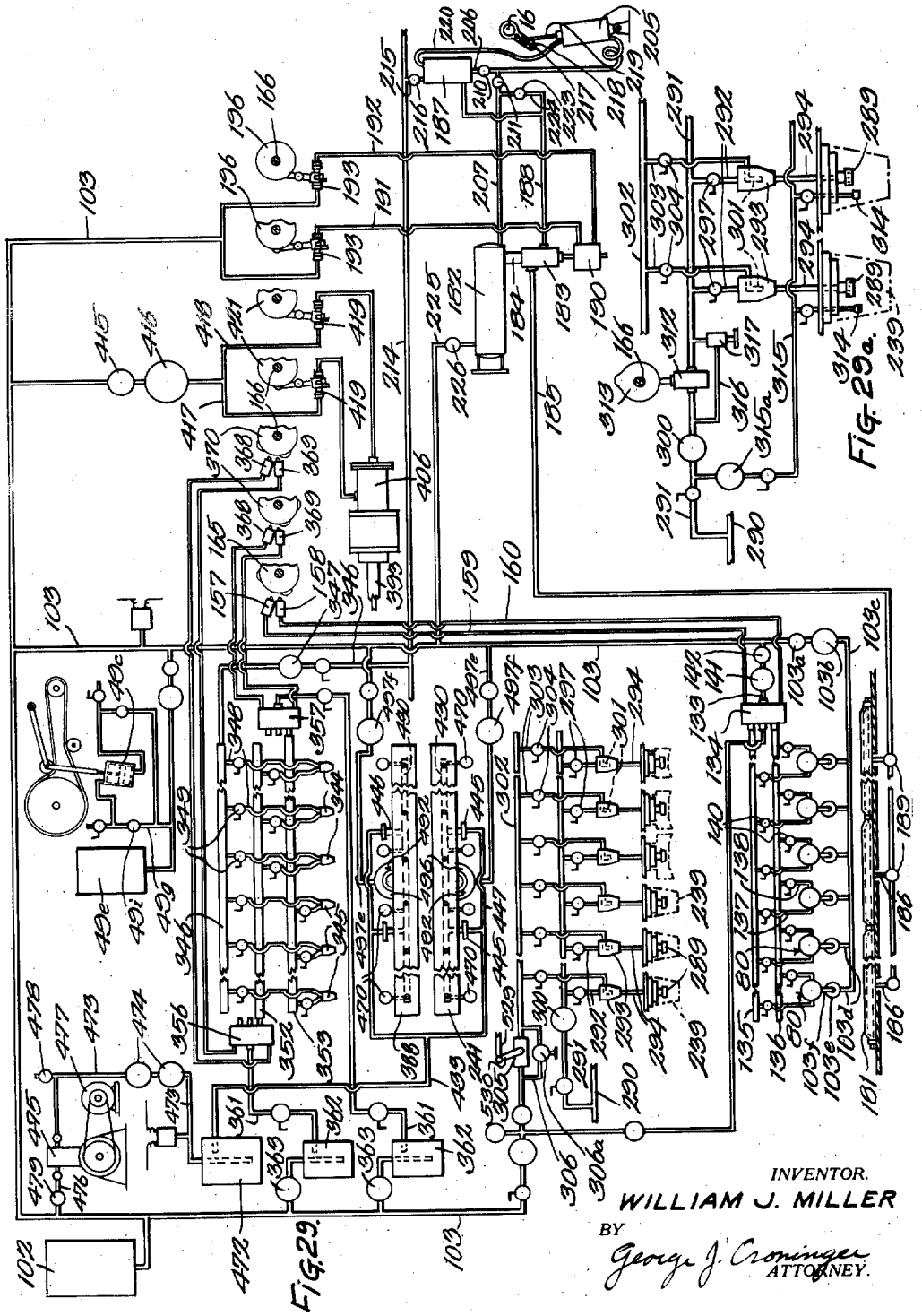

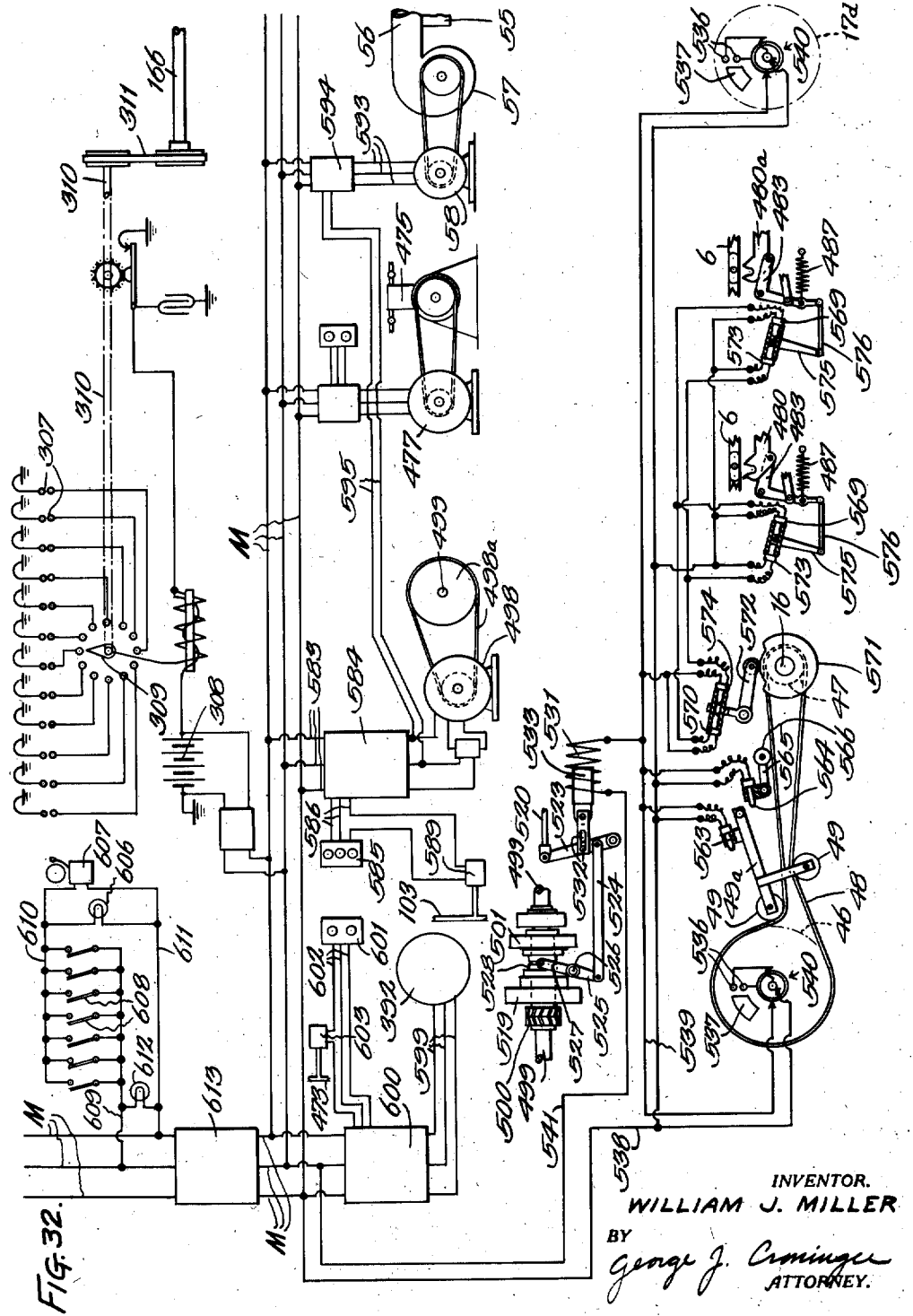

Patented Mar. 7, 1950

2,499,602

UNITED STATES PATENT OFFICE 2,499,602

APPARATUS FOR MANUFACTURING POTTERY WARE

William J. Miller, Swissvale, Pa., assignor to Miller Pottery Engineering Company, Swissvale, Pa., a corporation of Pennsylvania Application June 13, 1942, Serial No. 446,868

9 Claims. (Cl. 25—22)

This invention relates to apparatus for manufacturing pottery ware. The present application discloses subject matter also disclosed in my co-pending applications, Serial Nos. 205,711 and 421,299, now Patents 2,379,737 and 2,374,553, respectively.

In my United States Patents Nos. 2,046,525 and 2,109,028 respectively, I have disclosed how pottery ware of the class known as "jiggered dinnerware" may be made automatically and in large quantities by means of a production line system wherein the molds on or in which the ware is produced are circulated in endless lines along a path wherein clay is fed thereto, formed thereon, dried and then removed therefrom for such other processing as may be required.

The present invention has to do with several novel improvements in apparatus for manufacturing pottery ware in accordance with the foregoing system and, in this connection, the objects are to minimize production interruptions and increase the capacity to economically produce merchantable ware by improving the mechanical efficiency of the machinery generally and introducing new or improved apparatus for feeding, forming and drying the production together with provisions for safeguarding the machinery from damage due to causes normally beyond the control of the operator.

Other objects and advantageous features will be noted in the accompanying drawings and written description wherein like reference characters designate like parts and wherein:

Fig. 1 is a view in side elevation of the entire system including the fabricating machine and the dryer, with side wall portions of the dryer removed to disclose the conveyor means.

Fig. 2 is a view in plan of the entire system of Fig. 1.

Fig. 3 is a section taken substantially on the section line 3—3 of Fig. 1, showing the entire fabricating machine in plan, with certain parts broken away to disclose other parts, the machine being turned at right angles to the position it occupies on Fig. 1.

Fig. 4 is a cross section of the fabricating machine, as taken substantially on the section line 4—4 of Fig. 3, with the central portion of the machine being broken away to reduce the size of the figure.

Figure 5A:
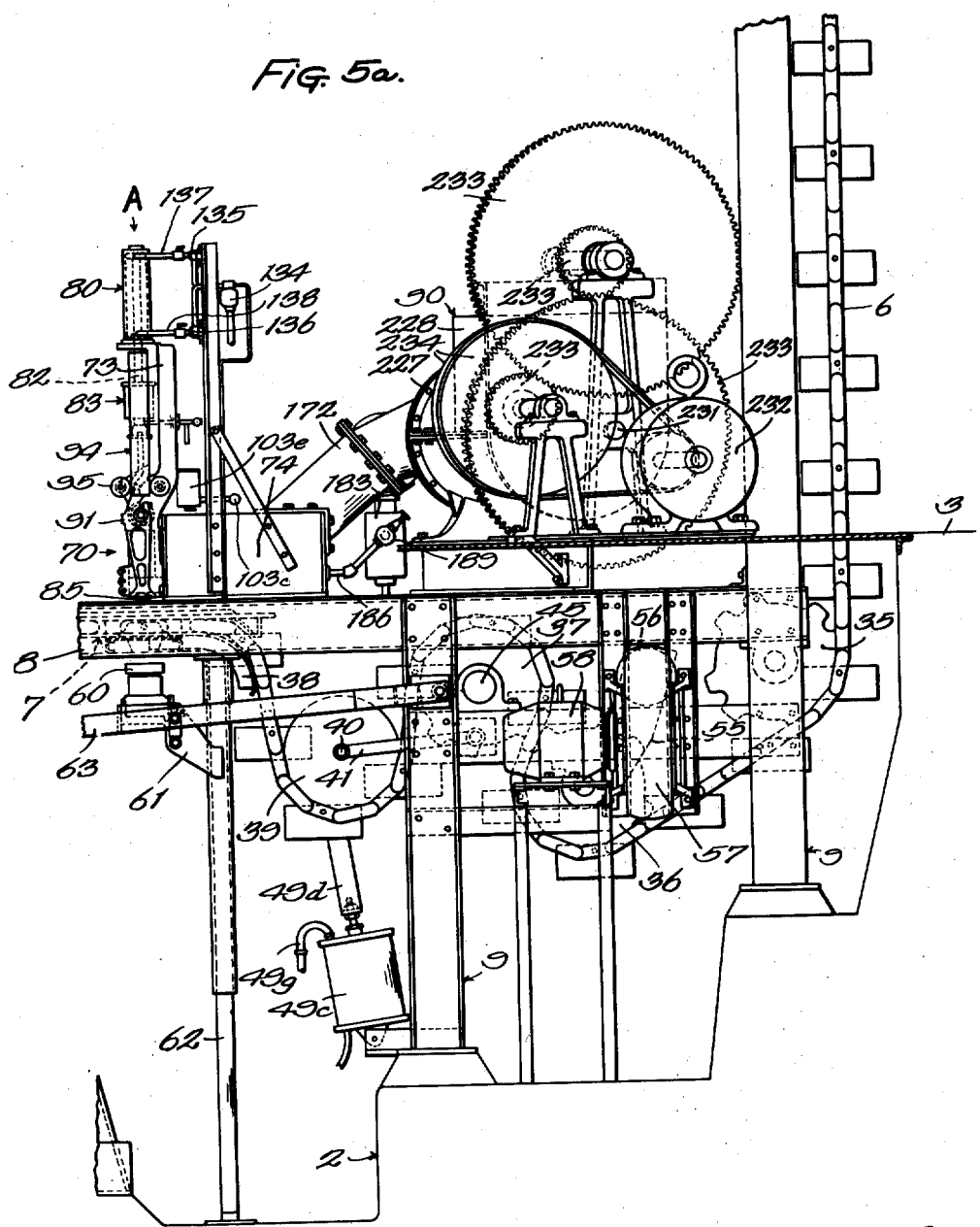

Figs. 5 and 5a together show an enlarged side elevation of the fabricating machine as seen in Fig. 1, or as viewed from the arrow 5—5a of Fig. 3, with certain housing panels removed to disclose parts otherwise hidden.

Figure 6A:
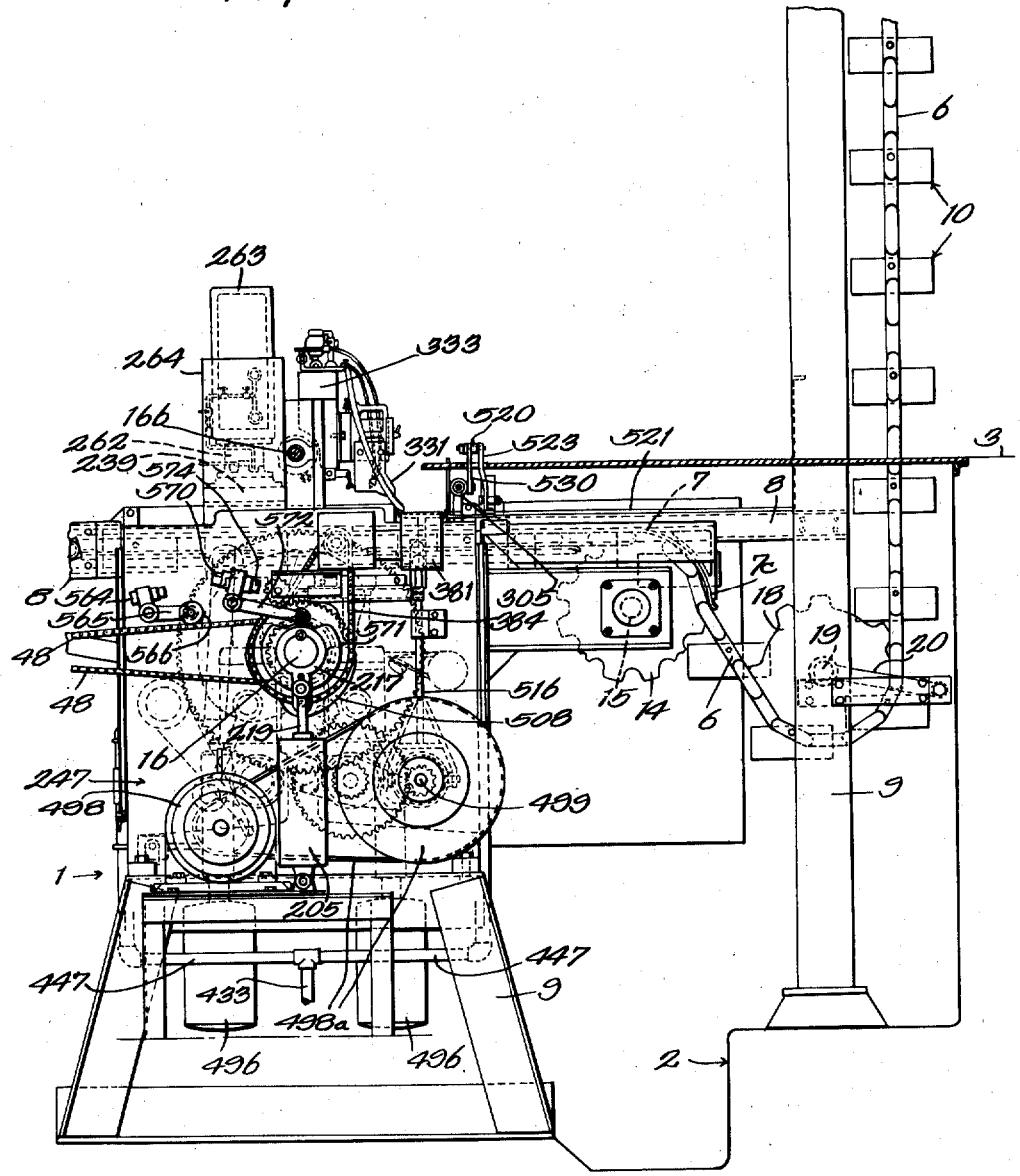

Figs. 6 and 6a together show an enlarged elevation of the opposite side of the machine as viewed from the arrow 6—6a of Fig. 3.

Figure 7A:
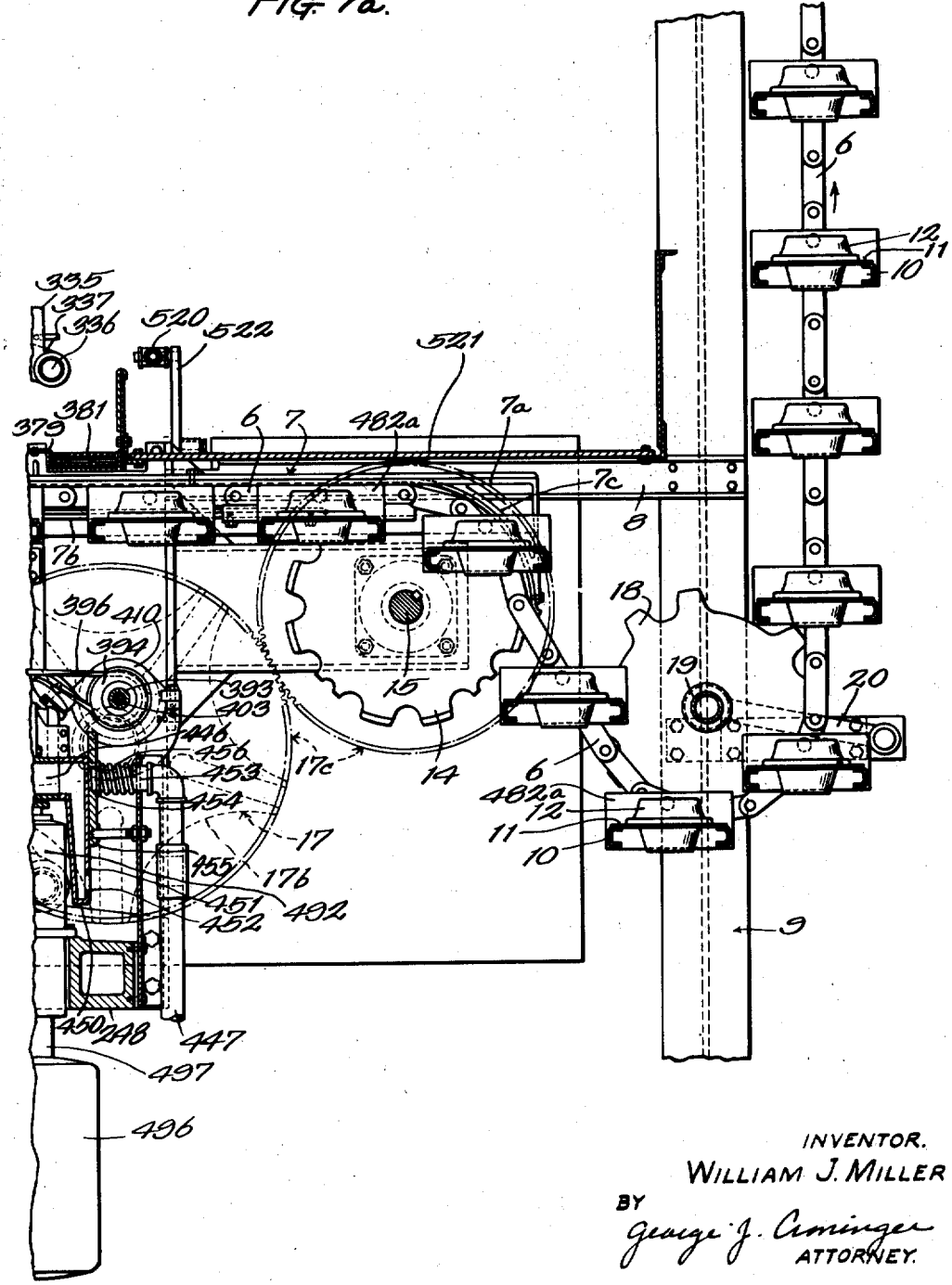

Figs. 7 and 7a combined show a longitudinal section of the machine as taken substantially on the section line 7—7a of Fig. 3.

Fig. 7b is an enlarged sectional detail of the kick-off valve shown in Fig. 7.

Fig. 7c is a front elevation of one of the feeders of Fig. 7.

Fig. 7d is an enlarged section taken on the section line 7d—7d of Fig. 7c.

Fig. 8 is a cross section of the machine taken at the jiggering station, as viewed from the section line 8—8 of Fig. 7, with portions of the machine omitted to reduce the size of the figure.

Fig. 9 is a detail section taken substantially on the section line 9—9 of Fig. 8, showing one of the tray locks.

Fig. 10 is a detail section taken substantially on the section line 10—10 of Fig. 4, with parts broken away.

Fig. 11 is a detail plan section taken on the section line 11—11 of Fig. 10, with parts broken away to reduce the size of the figure.

Fig. 12 is an enlarged detail plan section taken on the section line 12—12 of Fig. 10.

Fig. 12a is an enlarged detail of a modified form of releasable connection for parts seen in Fig. 12.

Fig. 13 is an enlarged detail of a modified form of construction for apparatus seen in Fig. 12.

Fig. 13a is an enlarged detail of certain parts seen in Fig. 10 and showing a modified form of detail construction.

Fig. 14 is a detail section taken on the section line 14—14 of Fig. 4.

Fig. 15 is a detail plan section taken on the section line 15—15 of Fig. 14.

Fig. 16 is a detail section taken on the section line 16—16 of Fig. 4.

Fig. 17 is a detail plan section taken on the section line 17—17 of Fig. 16.

Fig. 18 is an enlarged detail section taken on the section line 18—18 of Fig. 4, showing certain control valve means in connection with operating means therefor.

Fig. 19 is a side elevation of the parts seen in Fig. 18.

Fig. 20 is an enlarged detail section taken on the section line 20—20 of Fig. 18, with certain parts in changed position.

Fig. 20a is an enlarged detail section taken on the section line 20a—20a of Fig. 19.

Fig. 21 is an enlarged detail plan section taken substantially on the section line 21—21 of Fig. 18, showing one of the control valves.

Fig. 22 is an enlarged detail section taken on the section line 22—22 of Fig. 4, showing certain bleeder valve means in connection with operating means therefor.

Fig. 23 is a side elevation of the parts seen in Fig. 22.

Fig. 24 is an enlarged detail plan section taken on the section line 24—24 of Fig. 4, showing the jigger chuck rotating means with parts broken away to reduce the size of the figure.

Fig. 24a is a diagrammatic illustration of a modified form of means for rotating the jigger chucks.

Fig. 25 is a more complete detail of the central lower portion of Fig. 4, including the jiggering cross head counterpoise means not seen in said Fig. 4.

Fig. 26 is a section taken on the section line 26—26 of Fig. 25.

Fig. 27 is a plan view of the parts seen in Fig. 25.

Fig. 28 is an enlarged detail section of another form of the vacuum control valve for the crosshead seen in Fig. 26.

Fig. 29 is a piping diagram illustrating the pneumatic and hydraulic systems for operating the various devices of the apparatus.

Fig. 29a is a diagrammatic detail of a modified form of gas control apparatus for the system of Fig. 29.

Fig. 30 is an enlarged sectional view of one of the fluid pressure operated four-way control valves seen in Fig. 29.

Fig. 31 is an enlarged sectional view of the type of fluid pressure operated three-way control valve seen in Fig. 29.

Fig. 32 is a diagrammatic view of the various electrically operated or controlled instrumentalities of the system and illustrating one form or arrangement of an electric circuit therefor.

Fig. 33 is an enlarged detail sectional elevation taken on the section line 33—33 of Fig. 4, showing the automatically varying torque clutching connection.

Fig. 34 is an enlarged detail of the press head seen in Fig. 7, but showing the die in section.

Fig. 35 is a plan section taken on the line 35—35 of Fig. 34.

Fig. 36 is a diagrammatic illustration of one form of air circulation and conditioning system for the dryer.

Generally, as seen in Figs. 1 and 2, the fabricating machine 1 is preferably disposed in a pit 2 below the floor line 3 of a pottery plant, and spaced below the conveyor receiving end extension 4 of the dryer 5. By this arrangement, the entire system requires less floor space than otherwise in comparison to its output capacity, while at the same time rendering the fabricating machine accessible for servicing and for floor level trucking of filter press cakes to the pug mill.

The mold conveyor comprises a pair of spaced parallel sprocket chains 6 which are guided through the fabricating machine between upper and lower track portions 7a—7b of horizontal rails 7 mounted on the inner sides of longitudinal side frame members 8 of the machine frame 9 to prevent buckling of the chains. Pivotally suspended between the chains are trays 10 with open-bottomed mold stands or seats 11 for supporting the molds 12 (Figs. 3 and 4). While the molds of each tray may be adapted for the production of similar pottery table ware, those shown are adapted to produce diversified hollow ware and flat ware and form with molds on the other trays a plurality of parallel lines of production, each line preferably producing ware of similar type and weight but not necessarily having the same molding surface contour or design.

Referring to Figs. 5–5a and 7–7a, the conveyor is moved intermittently through the fabricating machine to intermittently advance the molds on the trays to a clay charge feeding station A where clay charges are fed to the molds; then to a preforming or press station B where the charges are spread over and secured to the molding surface of the molds into partially formed ware shapes, and then to a jigger station C where the partially formed ware is jiggered to final shape. Upon leaving the jigger station C, the chains 6 of the conveyor pass over intermittently rotated drive sprockets 14 which intermittently advance same through the machine, said sprockets being secured on a shaft 15 driven intermittently by a constantly rotating main drive shaft 16 through a Geneva motion connection 17, as seen in Figs. 5, 10 and 11.

The Geneva motion 17 includes a Geneva crank and lock cam 17a secured on the drive shaft 16 and which, during each revolution of said shaft, rotates a five pointed Geneva star wheel 17b one-fifth of a revolution which, in turn, rotates the conveyor drive shaft 15 one-fourth of a revolution through gearing 17c. Said gearing includes a gear 17d on the shaft 15 which is keyed thereto through a releasable connection G adapted to release the gear from the shaft in the event an abnormal torque is required to advance the conveyor through the machine, such as may be caused by the conveyor chains becoming jammed in the machine. For this purpose (see Figs. 10, 11 and 12), secured on the shaft 15 is an arm 17e upon which are opposed adjusting screws 17f threaded in lateral lugs 17g of the arm and between which is confined the free end of a lever 17h pivoted to the arm and having a bearing 17i at its free end supporting a spring pressed detent or plunger 17j having a tapered end 17k received within a tapered recess or bearing 17l in the gear 17d, whereby the detent will be depressed and released from the gear under an abnormal torque value imparted thereto. The detent may be spring pressed by a coiled spring 17m disposed in the bearing 17i and backed up by an end plug 17n threaded in the bearing to adjust compression of the spring to regulate torque value at which the detent will be released.

Another form of releasable connection is seen in Fig. 12a wherein a shearing pin 17o is substituted for the detent, being fixed in a bearing 17p of the arm 17h and extending within a bearing 17q of the gear 17d, to serve as a key connecting the gear and shaft 15 capable of breaking under abnormal resistance imposed on the shaft. To determine the abnormal resistance under which the pin will break, it may be provided with a peripheral groove 17r of the proper depth to weaken the pin accordingly. By adjusting the screws 17f, the angular position of the lever 17h on the arm 17e may be varied in varying the angular position of the gear 17d on the shaft to properly locate the trays at the various stations of the machine. The lever 17h may be locked in position on the arm 17e by means of bolts 17s passing through arcuate slots in the arm.

In the event the gear 17d is disconnected from the shaft 15, upon release of the detent, operation of the drive shaft 16 will be instantly stopped by safety means later described.

Referring to Figs. 1 and 5, as the conveyor moves from the drive sprockets 14, its chains are guided under arcuate end portions 7c of the track portions 7a to pass under vertically floating idler sprockets 18, from which the conveyor moves at a constant speed in an upward course into the dryer. The sprockets 18 serve to alternately take up and dissipate slack in the chains incident to transition from intermittent to constant travel thereof. The idler sprockets 18 are mounted on a shaft 19 mounted at its ends in bearings in the free ends of levers 20 pivoted to the machine frame.

The conveyor enters the dryer through an entrance opening 25 in the bottom of the dryer extension 4, and then moves toward the other end of the dryer in an undulatory path about upper and lower supporting sprockets 26 and 27 (Fig. 1).

As the trays of molds are progressed through the dryer, they are brought successively to a first stripping bay D, a second stripping bay E and a final stripping station F, so that certain types of ware to be appendaged, thus requiring various predetermined maximum percentage of moisture content, may be stripped from the molds, at said bays, while other types of ware, such as plates, requiring a minimum percentage of moisture may continue on through the dryer to be more fully dried before being stripped from the molds at the station F.

A multiple of horizontal ware conveyors 29 extending at right angles to the dryer conveyor, and located close thereto at said stripping bays and station, are provided so that attendants can transfer the ware from the molds to said conveyors without turning around, thereby reducing stripping labor cost. Along these conveyors, finishing operations may be performed in straight line production methods. These conveyors 29 may be in driven connection with the mold conveyor through reduction gearing 29a so as to travel at a slower rate than the latter conveyor to permit attendants to place the ware pieces thereon in stacks as they are taken from the mold conveyor.

The conveyor chains then continue back to the other end of the dryer over idler sprockets 30—31, then downwardly through an exit opening 32 in the bottom wall of the dryer extension 4, and thence through a mold cleaning zone I back through the fabricating machine for another cycle of operation.

As the conveyor approaches the fabricating machine, its chains are directed back to the rails 7 thereof by passing under two sets of idler sprockets 35 and 36, then over a set of driving sprockets 37 which pull the conveyor constantly through (Figs. 5a and 6) the dryer. Between the drive sprockets 37 and the downwardly curved ends 38 of the rails, which guide the chains thereon, the chain portions in the catenary are kept taut and spread to allow clearance between adjacent trays, by idler wheels 39 on a vertically floating shaft 40 supported in bearings at the free ends of levers 41 pivoted to the machine frame. Thus, the idlers 39 will take up and pay out the slack and maintain a catenary in the chain as the drive sprockets continuously move one portion thereof while the other portion on the rails is being halted and intermittently advanced.

The drive sprockets 37 are mounted upon a driven shaft 45 in driven connection with the main power shaft 16 through sprocket wheels 46 and 47 on said shafts, respectively, and a sprocket chain 48 connecting same (Figs. 6–6a). Certain of the upper sets of sprockets 26 supporting the conveyor in the dryer are in driven connection with the sprocket shaft 45 by means of sprockets 50 on their shafts 51 being connected with a sprocket 52 on the shaft 45 through synchronizing sprocket chains 53 (Figs. 1 and 3). Thus, the conveyor chain need take only the vertical load or weight of the trays plus drag between the intermediate sprockets 50.

The upper active and lower return stretches of the chain 48 are resiliently held bent toward each other by a pair of idler sprockets 49 on the arms of a bell-crank lever 49a pivoted to the machine frame at 49b and tensioned by a piston and cylinder tensioning device 49c through a link 49d to resiliently hold said stretches tensioned during normal operation of the machine. This provides a resilient connection between the main drive shaft 16 and the shaft 45 capable of yielding when the very long and heavy conveyor in the dryer is started to thereby reduce inertia peak load. Synchronizing chains 53 also prevent free running of the sprockets 50 in case the conveyor chain breaks, which would otherwise ravel off the sprockets and pile up on the bottom of the dryer.

Fluid under resilient pressure controlled by reducing valve 49i (Fig 29) is supplied from a reservoir 49e to the cylinder of the device 49c at its piston rod end to act as a constant value spring, the fluid surging back and forth through conduit 49g as the chain 48 is tensioned and released. By filling the cylinder of the device, then closing valve 49i, the piston thrust value may be progressively increased as the chain tension is increased.

The sprocket 46 is secured to the shaft 45 through a releasable connection H (Figs. 6 and 32), which will release under abnormal torque and simultaneously disengage shaft 45 from its source of power, substantially the same as that shown in Figs. 10 and 12.

As the trays enter the machine, each mold thereon is cleaned of any foreign matter, such as clay dust, and conditioned by a blast or jet of humid or dry air or water under pressure directed thereon by one of the nozzles 55 of an air pressure manifold 56 supplied by a blower or pump 57 driven by an electric motor 58 (Figs. 5a and 6).

When the trays are halted at the station A, the molds thereon are positioned over a line of elevatable chucks 60 which lift them from the mold seats into operative adjacency with the clay charge feeding apparatus, the seats being slightly larger in diameter than the chucks to permit same to move therethrough.

The mold chucks are mounted on a crosshead 61 mounted for vertical reciprocation upon suitable guides 62 which also serve as supporting uprights for frame members 8. The chucks are raised and lowered in timed relation with movements of the conveyor by a pair of levers 63 connected with the crosshead and oscillated by a connection with the main shaft 16 later described (Fig. 5a).

The mold charging apparatus employed in carrying out one form of the invention is more fully disclosed and claimed in my said co-pending application, Serial No. 421,299. However, said apparatus comprises a multiple of charge feeders 70 arranged respectively above the molds when at said station.

Generally, each feeder includes a replaceable, upright measuring and charging cylinder 71 (Figs. 7 and 7d) supported above the conveyor in co-axial alignment with a mold chuck 60, and from which a measured charge of clay is forcefully deposited onto the center of the molding surface of the molds when same are raised by the chucks. To this end, as seen in Figs. 7, 7d and 7c, each charging cylinder is detachably mounted within a lower split bearing 72 of an upright frame 73 secured to a clay conducting manifold 74 mounted on the machine frame. Operating within the charging cylinder is a hollow charge-ejecting plunger 75 secured to the bottom end of a plunger rod 76 slidably supported in a bearing 77 of the charger frame 73.

The plunger is reciprocated by a fluid pressure motor 80 mounted on the top of the feeder frame and within which operates a piston 81 on a piston rod 82 which reciprocates the plunger through an adjustable lost motion connection 83 connecting same with the rod 76 of the plunger.

At the bottom end of the charging cylinder 71 is detachably secured a charging outlet nozzle 84 which is normally sealed by a movable closure or gate 85. When the plunger 75 is raised, the gate is closed to form with the plunger bottom, a charge measuring and delivery chamber 88 in the cylinder 71 which is provided with an inlet 89 through which the clay is fed under pressure into the chamber from the manifold 74, the manifold having means therein to cause the clay to gush or surge forward uniformly into and fill the chamber. A clay extrusion device or pug mill 90 delivers clay to the manifold (Figs. 3 and 5a).

The gate 85 is connected between the bottom ends of a pair of levers 91 fulcrumed at 92 to the charger frame, about which point the adjacent faces of the gate and nozzle are formed arcuately with a slight clearance therebetween to vent the measuring chamber as it is filled with clay and to permit free movement of the gate.

The gate is also operated by the fluid pressure motor 80, which, through lost motion connection 83 and cam means, opens the gate before the feeder plunger is lowered to expel a charge of clay, and whereby the gate will be closed as the plunger is finally raised. For this purpose (see Figs. 7 and 7c) on the piston rod 82 is secured a cross-piece 93 from whose ends depend elongated cam members 94 guided for vertical reciprocation between rollers 95 and operating the gate levers through a cam slot and roller connection 96. The cam slot and roller connection is arranged to swing the gate to open position immediately prior to the plunger charging stroke, and to swing the gate to closed position immediately following the return stroke of the plunger, the lost motion connection 83 making possible the necessary plunger dwell periods between movements of the gate.

The lowermost position of the feeder plunger is determined by adjusting an adjustable stop nut 97 co-operating between the plunger rod 76 and lost motion connection 83, (Fig. 7c) which connection may also be adjusted to vary the upper limit of the plunger to thereby regulate the capacity of the measuring chamber in accordance with the charge bulk required to produce the desired ware. Thus the uppermost limit of the plunger may be determined independently of its lowermost limit which defines its approach to the molding surface of a mold to thereby adjustably define the thickness and shape of the clay charge therebetween and/or adhesion value after being pressed on the mold.

The upper position of the charger plunger, and consequently charge length, is visibly indicated on a scale 98 on the charger frame by an indicator 98a connected with the plunger rod (Fig. 7c).

As seen in Fig. 7d, the plunger 75 of each feeder has a bottom end portion 99 of permeable material through which air, under pressure, is directed during the final charge expelling stroke of the plunger to repel the charge therefrom after it has been forced thereby onto a mold. To this end, each permeable plunger end is in the form of a disc which may be constructed of concrete, pressed bronze powder or permeable bisque, and suitably detachably secured within a cavity 100 in the plunger bottom to form thereabove an air pressure chamber 101.

As seen in Figs. 7, 7b, 7c, 7d and 29, air under pressure is conducted into the chambers 101 from an air pressure tank 102 by way of a main line 103, a reducing valve 103a, an air filter tank 103b, conduit 103c, branches 103d thereof, kick-off valves 103e, plunger air inlets 103f and central passages 103g in the plunger rods, each valve 103e being opened during final downward movement of its respective plunger.

Each kick-off valve 103e (Fig. 7b) may include a valve housing 103h connected at its bottom end with its respective manifold branch 103d and having a central outlet port 103i in its top end normally closed by a spring pressed valve member 103j slidable in the housing. The valves are so arranged that as the inlets 103f, comprising downwardly extended pipe sections carried by the plunger rods, are lowered, they enter the outlet ports 103i and open same to establish connection therewith by depressing the valve members 103j. The kick-off valves may be mounted on the feeder frames for vertical adjustment to accommodate the various strokes of the feeder plungers, whereby the valves will operate in timed relation therewith.

Confined in the air pressure chamber of each plunger (Fig. 7d) is a filter pad 131 to further prevent any dirt or other foreign matter that may possibly get by the filter tank 103b from clogging the very minute openings in the permeable disc of the plunger or contaminating any clay that may be adjacent thereto.

The fluid motors 80 are energized to actuate the charger plungers, from the main air line 103, by way of a branch conduit 133, an intermittently actuated four-way valve 134 and conduits 135 and 136 leading from the service ports thereof with branches 137 and 138 connecting with opposite ends of the cylinders 139 of the motors. In each conduit branch 137 and 138 may be a throttling valve 140 for controlling flow of air into the cylinders to regulate the travel speed of the charger plungers.

In the branch air line 133 may be a storage tank 141 and between same and the line 103 may be a reducing valve 142 to maintain desired pressure in the tank.

The valve 134 is of the pilot valve operated type (Fig. 30) including a cylinder 143 within which reciprocates a hollow valve member 144 whose interior is in constant communication with the air line branch 133. As the valve member reciprocates, air pressure therein is alternately admitted to the service ports 147 and 148 of the valve cylinder by way of the ports 149 and 150 in the valve member. When air is being admitted to one of said service ports, the other connects with a vent port 151 in the valve cylinder by way of a port 152 in the valve member, to thereby vent one end of the cylinders of the motors 80 when the other end is under pressure.

As seen in Fig. 30, the opposite ends of the valve cylinder 143 are in constant communication with the interior of the valve member 144 through small leakage ports 155 and 156 in the member, whereby, as said cylinder ends are alternately vented and closed to atmosphere by bleeder valves 157 and 158 (Fig. 29) by way of conduits 159 and 160, the valve member will be reciprocated. For this purpose, the bleeder valves are of the spring pressed poppet valve type arranged to be successively opened by cam rollers 163 and 164 on the side of a cam disc 165 secured to a cam shaft 166 (Figs. 22–23). The cam shaft 166 extends transversely across the machine and is driven by the main shaft 16 in uniform timed relation therewith through a suitable sprocket and chain connection 167 (Fig. 4). To permit adjustment of the cam rollers 163 and 164 about the axis of the cam disc, said disc may have a series of apertures 168 spaced about the axis thereof for selection to mount studs 169 upon which the rollers may be supported.

The manifold 74 supplies clay to the measuring chambers of the various feeders through its series of outlets 171 and is designed to distribute the clay from the pug mill into and finally fill all the said chambers simultaneously and under a uniform compacting pressure. As seen in Figs. 5, 6 and 7, the manifold comprises an elongated box extending across the side frames 8 and into which clay is directed from the pug mill through an inlet duct 172 at the rear central portion of the box.

The pug mill shown is only one form that may be employed because, if desired, clay may be packed in large cylinders and either continuously or intermittently forced therefrom by means of rams into the manifold.

When the manifold is being initially filled with clay, air may be vented therefrom, as it is being displaced by the clay through vent cocks 173 provided along the top wall of the manifold (Fig. 7).

The outlets 171 of the manifold 74 extend across the bottom portion of the front wall 174 thereof in connection with the inlet 89 of the measuring chambers, with baffles 175 (Fig. 3) arranged at the sides of the outlets to form a series of outwardly diverging throats 176 which progressively become narrower and longer from the ends of the manifold to the center thereof.

Clay is directed forward and downward in the manifold toward the outlets by a V-shaped front baffle wall 177 which tapers inwardly toward the center thereof and extends inwardly and upwardly to the top of the manifold from the entrance ends of the throats 176. Said baffle wall 177 and throats 176 are so arranged and proportioned that clay will be forced through all the outlets at a substantially uniform rate and pressure from the manifold. The reason for this is that the capacity of the manifold progressively increases toward each end thereof, thus providing at each end a freer flow or less retarded area toward which the clay will readily flow from the central relatively more restricted pressure area of the manifold. Therefore, as the narrower longer throats 176 adjacent the center of the manifold offer greater resistance to the clay of the high pressure area than the shorter and wider throats offer to the lower pressure area, the clay will be forced into all measuring chambers at a substantially uniform rate and under a substantially uniform pressure.

In that the clay bulk demand of the feeders may differ considerably in accordance with the types of ware for which the charges are intended being changed from time to time, a supplemental manually adjusted slide valve 180 is provided between the inlet 89 of each measuring chamber and its adjacent manifold outlet 171 (see Fig. 7d) to provide a variable port therebetween for regulating the flow of clay into the chambers to insure that the filling of all of them will be concluded simultaneously.

To insure that the measuring chambers are completely filled and solidly packed with clay during the relatively short period this operation is confined, clay displacement devices or pulsators 181 are provided in the manifold to develop a periodically recurring increase in pressure on the clay and thus cause a quick gushing movement thereof through the manifold outlets and into the measuring chambers.

The pulsators comprise hose sections arranged along the rear wall of the manifold opposite its outlets (Figs. 3, 7 and 29) and intermittently inflated by a fluid under pressure, such as water, from a supply tank 182 by way of an intermittently operated three-way control valve 183. As seen in Figs. 29 and 31, the valve 183 is of the poppet type which, in one position, connects the supply tank 182 with the hose sections to inflate same by way of an inlet conduit 184 of the valve and an outlet conduit 185 with branches 186 leading to said hose sections. In the other position of the valve, the water in the hose sections is exhausted therefrom to cause collapse of the hose under pressure of the clay being progressed into the manifold, into a water reservoir 187 by way of an exhaust conduit 188. In each branch 186 may be a throttling valve 189 to control the flow of fluid to each hose section so as to selectively regulate the rate and extent of expansion thereof in accordance with the clay bulk demand of the measuring chambers toward which the clay in the manifold is displaced by each section, to thereby complete the filling of all measuring chambers substantially simultaneously and within the shortest possible period of each cycle of operation of the system, regardless of the extent to which their clay bulk demand varies.

The valve 183 is actuated by a cylinder and piston fluid motor 190 and is so timed as to cause the hose sections 181 to quickly expand and urge clay into the measuring chambers, then instantly release the fluid pressure in the hose whereby clay progressing pressure within the manifold will cease and movement of the clay through the manifold outlets will be halted prior to and during the open position of the gates. This prevents the clay from gushing through the outlets and measuring chamber nozzles between the time the gates are opened and the charger plungers descend sufficiently to close the outlets, to insure that only such clay as is confined in the chambers will be ejected therefrom. It also instantly eliminates the abnormal high clay back pressure against the pug mill auger and thus enables immediate normal functioning thereof over the greatest practical time period to progress clay into the manifold and fill the voids adjacent the hose sections, caused by displacement of previous charges.

The fluid motor 190 is energized from the main high pressure air line 103 by way of two conduits 191 and 192 leading to the ends of the cylinder of the motor with a two-way slide valve 193 of a common type, interposed in each conduit to control the flow of air to and from the cylinder ends (Fig. 29).

As seen in Figs. 18, 19 and 21, each valve 193 has a reciprocating slide valve member 194 reciprocated by a centrally fulcrumed oscillating lever 195 operated by a cam disc 196 on the cam shaft 166 through two lateral pins 197 and 198 on the disc which alternately engage a roller 199 on the free end of the lever. For adjusting the pins 197 and 198 about the axis of each disc 196 to regulate the timing of the operation of the valves 193, the disc is provided with inner and outer concentric rows of apertures 200 and 201 for mounting the pins.

An optimum amount of water, under pressure, is substantially maintained in the supply tank 182 from the water reservoir 187 by way of a cylinder and piston type pump 205 which pumps water from the reservoir through conduits 206 and 207 to the tank, there being suitable check valves 210 and 211 in the conduits for water flow control. The tank 187 may be initially filled with water and/or the water level re-established from a water main 214 by way of a conduit 215 controlled by a valve 216.

The pump 205 may be operated by a crank 217 on one end of the main shaft 16 with adjustment pivot apertures 218 spaced therealong for connection with the pivot pin of the pump piston rod 219. Any water leaking past the pump piston may be conducted back to the reservoir by way of a flexible conduit 220.

The pump stroke is adjusted to deliver somewhat in excess of the volume normally required to fill the pulsators, the excess escaping through relief valve 223 in a by-pass 224 into the reservoir 187 to maintain optimum water level and pressure in the tank 182. The pump also serves to retard or brake rotation of the shaft 16 while the press and jigger crossheads are descending, the crank 217 being so angularly positioned during this interval to cause the pump to expel water against high resistance.

Optimum air pressure is maintained above the water in tank 182 from the main air line 103 by way of conduit 225 controlled by valve 226.

The pug mill 90 may include a conventional clay mascerating and progressing barrel 227 mounted upon side frames 8 (Figs. 3, 5a and 6). Near its rear end is a filling hopper 228 through which clay filter cakes are charged, where they are mascerated and then progressed into the manifold 74 through duct 172, by knives 229 and an auger 230 on a shaft 231 rotated by an electric motor 232 through speed reducing gearing 233 and belt and pulley drive 234.

Obviously, an upright and/or a vacuum type pug mill may be employed.

In operation the clay in the manifold 74 adjacent its inlet 172 is alternately under a primary progressing pressure head exerted by the auger 230 and under supplemental pressure delivered by the pulsators 181 to cause the clay to gush into the measuring chambers within a very short period of each charging cycle. During filling of the measuring chambers, air will escape between the gates and chamber outlets and through the permeable plunger ends whereby air bubbles in the charges will be avoided and predetermined charge weight maintained.

Immediately after the clay is packed solidly in the measuring chambers, the pulsators are deflated, and immediately thereafter the gates are opened, the plungers lowered and raised and the gates closed, preferably all in very rapid succession whereby the clay charges will be quickly deposited and stuck onto the ware forming surfaces of the molds positioned therebelow.

When the feeder plungers are lowered, the cylindrical clay charges are ejected from the measuring chambers and compressed onto and stuck to the ware forming surfaces of the molds exactly co-axial therewith, until they assume a doughnut-like shape presenting a ring-like peripheral portion surrounding a relatively thin depressed central portion. While this operation occurs when the molds are lifted from the trays, as illustrated, it is contemplated that the molds may remain on the trays, if desired. However, charging of the molds while on the chucks is preferred because the chucks are non-resilient and vertically adjustable, and they also dependably position the molds vertically and horizontally.

By so definitely shaping and measuring the charge bulk before it is exposed to atmosphere, then gripping it incident to its being deposited onto the molds, then spreading and reforming it thereon to a predetermined shape optimum to final definite marginal spreading and incident thereto pressing the charge into adhering connection with the molds to prevent its displacement thereon while being rapidly transported to and operated upon by the final spreading preforming apparatus, or press, at the station B, insures spreading of the charge radially to a uniform and optimum extent and thickness for jiggering without providing the conventional 35 per cent excess clay bulk in each charge, thus insuring optimum mold coverage, blank contour and thickness for the most practical jigger operation that will produce perfect ware.

Preforming station B

After the charges of clay have been deposited on the molds, the chucks 60 are lowered to return the molds to the trays, which, upon two successive movements of the conveyor, are brought to the station B with the molds thereon centered over a line of vertically reciprocating mold chucks 238 (Fig. 7). The chucks are then elevated to raise the molds off the trays into cooperative relation with preforming dies 239 to spread the charges of clay over the ware forming surfaces of the molds into jiggering bats or partially formed ware shapes ready for the jiggering operation.

The mold chucks 238 have bases 240 mounted on a crosshead 241 whose ends are guided for vertical reciprocation within vertical guideways 242 and 243 in side walls 244 and 245 of housing structures 246 and 247 connected by a base member 248 therebetween. The crosshead 241 is reciprocated by an oscillating crank shaft 251 therebelow whose cranks 252 connect with the crosshead through links 253. The crank shaft 251 is operated by the main drive shaft 16 (Figs. 16 and 17) through cams 254 and 255 which, respectively, cooperate with arms of a bellcrank lever 256 to postively oscillate the crank shaft through a crank 257 thereon and a link 258 connecting therewith, the cams functioning through rollers 258a on the arms of the bellcrank to assist gravity in pulling the crosshead down. During the initial crosshead lowering movement of the bellcrank 256, the action of the cam 255 thereon is supplemented by a dash pot 259 through air under pressure below the dash pot plunger 259a engaging an arm 260 on the hub 260a of the bellcrank (Fig. 16). As the crosshead is reciprocated, it also causes reciprocation of the crosshead 61 through links 261 and levers 64 connected therewith (see Fig. 7).

The dies 239 are mounted for quick exchange on the under sides of open sided box-like brackets 262 mounted on the under side of a hollow supporting lintel 263 secured at its ends upon upper wall extensions 264 of the housing structures 246 and 247 (Figs. 34 and 35). Each die is adjustbly threaded onto the stud portion 265 of a base 66 and held locked thereon by a set screw 267. The die base 266 is detachably secured to bracket 62 by a quick action latch lock. For this purpose, said base has a central tapered boss 269 entered in an aperture 270 in the bracket bottom with a cone headed stem 273 adjustably threaded into the boss and extending through the aperture and a slot 274 in a pivoted latch member 275, with the stem head 276 engaging the inclined upper surface 277 of the latch which acts as a wedging key between the stem head 276 and the bracket bottom to clamp the base on the bracket in the locking position of the latch. To release the die from the bracket, the latch 275 is moved counterclockwise (Fig. 35) to bring the enlarged end 278 of the slot 274 in register with head 276 to permit same to pass therethrough. The extended end 279 of the latch enables striking it with a hammer to release and engage the latch, and a spring 280 prevents same from working loose and to take up expansion in stem 273 as it heats up.

To insure that the molds are released from the dies as they are lowered after the pressing operation, especially those for hollow ware, means such as that disclosed and claimed in said copending application Serial No. 205,711 are employed. To this end, each hollow ware die 239 is freely disposed within a downwardly spring pressed mold stripper ring 282 which is raised by a hollow ware mold into pressing engagement therewith upon its final upward movement into operating position with the die, whereby the mold will be stabilized in the chuck during the bat-forming operation and whereby the mold will be stripped from the die as it is lowered by the chuck. The stripper ring mold contacting surface may be formed of resilient material such as rubber, and may be secured to a centrally open supporting plate 283 slidably supported at its corners upon bolts 284 depending from the die bracket, with coiled springs 285 on the bolts and disposed between the bracket and plate to urge same against stop nuts 286 on the bottom ends of the bolts.

The dies are herein shown as heated so that their forming surfaces will repel the clay bats formed thereby as they recede therefrom and remain in adhering relation with the molds. For this purpose, each die is hollowed out to present a comparatively thin walled shell against whose inner wall are selectively directed jets of flames from a gas burner 289 depending from the die base 266. There may be a multiple of such burners in the die, if desired. Gas is supplied from gas main 290 (Figs. 29a and 34) by way of a conduit 291, branches 292 leading to air mixing chambers 293 and pipes 294 continuing therefrom to the burners by way of passages 295 and 296 in the die brackets and die bases respectively (Fig. 34). In each branch 292 may be interposed a throttling valve 297 to regulate the flow of gas to the mixing chambers 293.

The gas in the conduit 291 is supplied under practically zero pressure from main 290 through a reducing valve 300, but is drawn into mixing chambers 293 for proper air mixture and impelled therefrom to burners 289 under a higher pressure by air pressure syphon nozzles 301 arranged in the mixing chambers and connected with the main air pressure line 103 through a conduit 302 and branches 303 thereof (Fig. 29a). A throttling valve 304 is interposed in each branch 303 to control the heating of each individual die.

In the conduit 302 is a shut-off valve 305 with a by-pass 306 thereabout controlled by a needle valve 306a to maintain the dies at a minimum temperature when the valve is automatically closed as the machine is stopped.

As a safety measure, an ordinary igniting element, such as a spark plug 307 (Fig. 34) is interposed in each die chamber, and momentarily energized during each cycle of operation of the machine to insure that ignition of the gas will be maintained. As seen in Fig. 32, the spark plugs 307 may be energized successively from a low voltage battery 308 or any suitable source through an ordinary ignition system including a distributor 309 whose rotating switch arm shaft 310 may be driven by a motor or by the cam shaft 166 through a belt and pulley drive 311. In the gas line 291 may be shut-off valve 312 operated by a cam 313 on the cam shaft 166 (Fig. 29a) to intermittently admit gas to the burners in timed relation with the ignition system while the crosshead 341 is moving, thus maintaining die temperature constant, regardless of variations in machine speed or stopages. In this method, the spark plugs may be energized frequently or perpetually, and may or may not be synchronized with the operation of the gas valve 312. Also, a pilot burner 314 (Fig. 29a) may be substituted for each spark plug and supplied from the gas main 290 by a branch 315 controlled by a reducing valve 315a, and/or a by-pass 316 may be interposed in the line 291 about the valve 312 controlled by a needle valve 317 to maintain a predetermined minimum gas supply for the burners to maintain a lower but optimum temperature maintenance flame between pressing cycles.

Jigger station C

The molds are held by the chucks 238 in association with the press dies 239 only momentarily, whereupon they are lowered onto their tray, as the chucks are lowered, and then advanced to the jigger station C upon the next movement of the conveyor. At this station (Figs. 3, 4, 7 and 8), the molds are positioned centrally over a row of vertically reciprocable and rotatable mold chucks 330 which then raise the molds off their tray and position them in cooperative relation with profiling tools 331 and 332 for the flat ware molds and hollow ware molds respectively, the molds then being rotated to effect the final profiling of the partially formed ware by the tools as the chucks are rotated while remaining in elevated position during the major portion of each cycle of operation of the machine.

The profiling tools 331 and 332 are adjustably supported in a lintel 333 mounted at its ends on the upper extensions 264 of the housings 246 and 247. The flat profile tools are normally stationary, while those for hollow ware of undercut shape are oscillatably mounted to move angularly radially of the axis of the molds into profiling position after the molds are raised, and then retract angularly radially from the ware before the molds are lowered to effect a relative wiping movement of the tools away from the ware so as to produce a smoother finish on the inner side walls thereof, while at the same time allowing the tool to clear the restricted mouth of undercut ware while the molds are lowered, as more clearly described and claimed in my said Patent No. 2,046,525. However, each hollow ware profile 332 depends from a tool holder 334 mounted for vertical adjustment in a swinging frame 335 pivoted at as 336 (Fig. 7) on the outer end of a bracket 337 on lintel 333. Each frame 335 is oscillated in an arcuate plane to bring its profile into and out of working position by a cam 338 mounted on the cam shaft 166 and acting through a centrally fulcrumed lever 339 in contact with which the frame 335 is held by a spring 341.

During the jiggering operation the ware surfaces are lubricated by sprays of atomized fluid or water directed thereon by sets of atomizers 344 and 345 for the flat ware and hollow ware respectively, (Figs. 4, 7 and 29). These atomizers may be adjustably secured to the lintel 333 and supplied from the water main 214 by way of a conduit 346 controlled by a reducing valve 347, and conduit branches 348 controlled by throttle valves 349. Air under pressure is intermittently supplied to the sets of atomizers through manifolds 352 and 353, respectively, from air line 103 by way of three-way valves 356 and 357. Each valve 356 and 357 is of the type shown in Fig. 30, with one of its supply ports plugged up while the other is connected with its respective manifold, and with its inlet port 360 connected with the line 103 by piping 361, included in which is a filter 362 and a pressure reducing valve 363. The bleeder valves 368 and 369 for operating each of the valves 356 and 357 may be operated by a cam 370 of the type shown in Fig. 22 and mounted on the cam shaft 166. However, the cams 370 controlling the hollow ware lubrication may have one or more sets of cam rollers 163 and 164 to cause one or more spray blasts to be applied during each cycle.

Arranged adjacent each profile tool is a trimming tool 373 (Figs. 4 and 7) which, during the jiggering operation, is lowered into engagement with the brim of a mold to remove the excess clay. Each trimmer comprises a wire tensioned between legs of a V-shaped frame 374 clamped for angular adjustment on the end of a centrally fulcrumed vertically oscillatable lever 375 operated by a cam 377 on the cam shaft 166 to raise the wire and urged by a spring 378 to depress it into operative position.

As scrap clay is removed from the molds by the trimmers and profiles (Figs. 3, 4, 7 and 7a), it is deflected over a guard shelf 379 onto a belt conveyor 381 to be conveyed from the machine, the conveyor being supported alongside the shelf upon an idler pulley 382 and drive pulley 383 driven by the main shaft 16 through a sprocket and chain connection 384 and gearing 385. At the discharge end of the conveyor 381 may be a blunger and slip pump organization 385a for returning the scrap clay to a filter press or a conveyor for progressing the clay back to the pug mill and suitable screens, blowers and other apparatus may be included to recondition the clay to optimum condition. The shelf 379 extends across the machine and has openings 386 within which the molds are freely disposed during the jiggering operation.

Upon completion of the jiggering operation, the molds are lowered by the chucks 330 onto their tray to be conveyed into the dryer, the chucks ceasing to rotate before the molds engage the tray.

For operating the chucks 330, they are supported on a vertically reciprocating crosshead 388 (Figs. 4, 7 and 8) on which are hollow chuck bases 389 with upright bearings 390 supporting shafts 391 depending from the chucks. The chucks are rotated by an electric motor 392 (Fig. 4) carried by the crosshead 388 and driving the chucks through a hollow jack-shaft 393 carried by the crosshead with sheaves 394 thereon driving sheaves 395 on the chuck shafts through belts 396.

The motor 392 drives the jack-shaft through a sheave and belt connection 399 including a driven sheave 400 rotatably mounted on said shaft and coupled therewith to rotate the chucks 330, when raised, by a fluid pressure operated multiple disc clutch 401 (Fig. 24) arranged at one end of the jack-shaft. The clutch 401 includes a disc-like clutch applying member 402 which is moved laterally into and out of applying position by being secured to the end of a shaft 403 rotatably and slidably mounted within the jack-shaft with its other end coupled, through a swivel connection 404, with the piston rod 405 of a cylinder and piston fluid motor 406. The motor 406 is supported at one end of a brake drum 410 removably mounted on a bracket 411 of the crosshead 388, with the adjacent end of the jack-shaft 393 supported in a bearing 412 at the other end of the drum and extending therein. A multiple disc clutch 413 is operably arranged between the drum and jack-shaft end to couple same upon release of the drive clutch 401 to apply a braking effect on the jack-shaft to insure that the molds supported by the chucks 330 will be stopped from rotating before they contact the tray. The clutch device 413 includes a cup-shaped applying member 414 secured on the piston rod 405 to be moved into and out of applying position as the applying member 402 is moved out of and into applying position.

The fluid motor 406 (Figs. 24 and 29) is energized from the main air line 103 through a reducing valve 415, supplemental tank 416 and conduits 417 and 418 with a control valve 419 interposed in each conduit to effect operation of the motor piston. These valves 419 are duplicates of the valves 193 (Figs. 4, 18, 19 and 21) and are operated by cams 421 arranged on the cam shaft 166 and comprising duplicates of the cams 196.

Referring to Fig. 24a, the motor 392 may be mounted on the machine frame, or otherwise independently supported, and drive the jack-shaft 393 through an upright drive belt 425 supported at its top end on an idler pulley 426 on the machine frame, with the driven pulley 400 of the jack-shaft held in driven connection with one side of the belt by same being looped thereover by an idler pulley 427 carried by the crosshead, thus maintaining belt tension constant throughout vertical travel of crosshead.

The jigger crosshead 388 is similar to the press crosshead 241 and is mounted for vertical reciprocation and operated by the main shaft 16 through elements characteristic of those described in connection with the press crosshead and designated by similar reference characters having prime exponents. However, the cams 254' and 255' would be so contoured as to cause the molds to remain in cooperative relation with the profile tools during the greatest possible length of time to properly complete the profiling operation.

During the time the molds are elevated by the press and jigger crossheads, they are held firmly in the chucks thereof by same being vacuumized from a vacuum manifold formation 430 of each crosshead by way of the manifold inlets 431 and central passages 432 in the shafts of the mold chucks (Figs. 7 and 8). The manifold 430 of each crosshead is intermittently vacuumized from a vacuum line 433 (Figs. 25, 26, 27 and 29)

through a pair of slide valves 445 which cooperate between the outlets 446 of the manifold and branches 447 of the vacuum line, said valves being operated by the crosshead as it reciprocates. Each slide valve 445 includes a downward extension 450 of its respective manifold outlet (Fig. 26) with a side wall 451 having a port 452 normally open to atmosphere to vent the chucks and arranged to establish communication with the end 453 of its respective vacuum line branch as the crossheads approach their raised positions to vacuumize the chucks. Sealed communication is maintained between the port 452 and the branch vacuum line end through a port 454 in a sealing plate 455 arranged on said branch end and pressed into engagement with the side wall 451 of the outlet extension 450 by a coiled spring 456 on said branch end and backed up by a bracket 457 of the machine frame which also supports said branch end.

In Fig. 28 is shown a preferred poppet type of vacuum valve construction that may be substituted for the slide valves 445. In this form, each manifold outlet would continue into a depending end portion 458 on whose bottom end is secured, by a clamping ring 459, a resilient packing ring 460, with its respective vacuum line branch 447 having an upright end 461 extending freely within the packing ring with a poppet valve 462 closing the top end thereof while the vacuum manifolds are vented through the packing ring in the lowered position of the crossheads. The poppet valve 462 is normally seated on the top end of a replaceable closure sleeve 463 on the branch line end 461 over which the packing ring 460 slides in sealing engagement to close the outlet to atmosphere while the poppet valve 462 is opened by pins 464 arranged in the outlet extension to establish vacuum in the vacuum manifolds of the press and jigger crossheads when same are raised. The poppet valve 462 may have a depending centralizing formation 467 to insure proper seating of same on the sleeve 463, and the bottom end of the sleeve may be tapered as at 468 to facilitate the expansion of the packing ring 460 thereover when initially engaged thereby. The packing ring 460 may be split to facilitate its replacement.

To purge and maintain the vacuum manifolds free of foreign matter that may be drawn therein from the chucks, at the far ends and/or along the bottom of each may be intake ports controlled by vacuum relief valves 470 set to open when optimum vacuum value has been established in the manifold to cause an effective gust of air to move along the manifold bottom to thereby remove the foreign matter therefrom (Fig. 8).

The vacuum line 433 is supplied from a storage and stabilizing tank 472 (Fig. 29) connected through conduit 473 and filters 474 therein with the intake ports of an air compressor 475 which also supplies the air pressure tank 102 through conduit 476 and line 103, said compressor being driven by an electric motor 477. In the conduit 473 may be a relief valve 478 set at a higher value than valves 470 to limit maximum value in the tank 472, and in the conduit 476 may be a pressure relief valve 479 to limit the pressure in the air pressure tank 102.

To insure that the trays are properly positioned at the feed, press and jiggering stations to center the molds thereon over the chucks at said stations, tray locking and positioning means are provided. As the trays are advanced to the press and jiggering stations, the ends thereof are brought alongside of a pair of horizontal locking bars 480 and 480a (Figs. 7, 8, 9, 10 and 11) which are then raised and cause the trays to be locked into proper position as locking notches 481 in the bars receive and firmly hold the trunnions 482 of the trays, while the upright end plates 482a of the trays that support the trunnions are guided under upper rail portions 7a of the rails 7 to hold the trays level. Each locking bar is supported for movement to raised and lowered positions by a pair of bellcranks 483 and 484 fulcrumed on adjacent rails 7 with their arms pivotally connected, respectively, with the ends of the bar and a connecting link 485 which causes the bellcranks to operate in unison to maintain the bar horizontal.

The locking bars are operated by the jigger crosshead 388 which, in its lowered position, holds the bars depressed through connecting rods 486 and bellcranks 484, the bars being raised into locking position as the crosshead is raised, by a spring 487 connected between each bellcrank 483 and the machine frame. The connecting rods 486 are in lost motion connection with the jigger crosshead so that the locking bars will be elevated to lock the trays in position before said crosshead and the press crosshead have elevated their chucks into engagement with the molds of the trays. For this purpose, each connecting rod may extend downward through and be slidably received in a bearing 488 of the crosshead and have a stop collar 489 adjustably secured on the bottom end thereof for co-operative engagement with the bearing to hold the bars depressed when the crosshead is in lowered position.

*Counterpoise*

Counterpoise means is provided for the press and jigger crossheads to reduce the torque requirement when lifting the heads and to minimize backlash and reverse torque being applied to the driving means when the crossheads descend, whereby the rate of rotation of the main drive shaft will be maintained at a constant value throughout the entire machine cycle in preventing racing and lagging of the various devices operated thereby. The said means (Fig. 8) includes a dash pot 492 arranged below the central portion of each of the press and jigger crossheads and including an upright cylinder 493 supported in an opening in the base frame 248 and within which operates a plunger 494 supported in a top end bearing 495 of the cylinder and normally urged into pressure engagement with its respective crosshead by fluid under adjustable predetermined pressure acting thereon and conducted to the dash pot from an upright fluid pressure tank 496 arranged therebelow. The fluid under pressure, such as liquid or air, is conducted from the tank 496 to the dash pot by way of central riser 497 therein connecting with the dash pot through a restricted port 497a in the bottom thereof normally closed by a tapered valve formation 497b at the bottom end of the plunger 494 when same is in lowered position. As the crosshead reaches its raised pisition, the plunger is stopped short thereof by having a shoulder 497c near its bottom adapted to engage the bearing 495 to limit upward movement of the plunger, thus facilitating initial descent of the crosshead.

As each plunger 494 approaches its lowered position the valve end 497b progressively decreases the area of the port 497a whereby resistance to the fluid forced therethrough from the dash pot by the plunger will be accordingly increased to create an increasing cushioning pressure upon the crosshead to progressively decelerate final travel.

The tank 496 is only partially filled with liquid and the upper portion is under pressure from the line 103 by way of branch 497e (Fig. 29) and pressure regulator valve 497f to control the counter-balancing value of the plunger 494.

*Main drive shaft power means*

The main drive shaft 16 is driven by an electric motor 498 through sheave and belt drive 498a, a jack-shaft 499 (Figs. 4, 6a, 14 and 15) and speed reducing gearing 500 coupled therewith through an automatically varied torque, multiple-disc friction clutch device 504 (Figs. 4 and 33) with a clutch applying member 507 controlled by a cam 508 on shaft 16 through an adjustable resilient connection 509 whereby its pressure of application and torque value is increased and decreased in direct proportion to the normal increasing and decreasing torque requirement of shaft 16 at various positions thereof in each cycle, and whereby the clutch will slip under abnormal load imposed on said shaft, to prevent damage to the machine. The resilient connection 509 includes a horizontal shaft 510 oscillated by cam 508 through a lever 511, another lever 512 on said shaft having a spring barrel 513 containing a coiled spring 514 held under adjustable compression between the barrel bottom, and a plunger 515 in the barrel engaging the top end of a forked lever 516 pivoted near the clutch at 517 and connected with the clutch applying member 507 through a trunnion and grooved collar connection 518 whereby, as the spring barrel is oscillated by the cam 508, the spring 514 will be compressed and relaxed and cause pressure application value on the clutch plates and torque transmitting value to vary accordingly, substantially characteristic of the subject matter of my Patent No. 2,274,427.

*Safety control system*

The clutch 501 and a brake 519 of the shaft 499 are operated to start and stop operation of the machine by a manually actuated longitudinally shiftable rod 520 extending across the machine adjacent the operator's platform 521 (Figs. 4 and 6a) to enable the operator to instantly stop and also start the machine. Rod 521 is fulcrumed at its ends to an idler lever 522 and an operating lever 523 connected by a link 524 with a lever 525 on the top end of a shaft 526 having a yoke 527 on its lower end for shifting the clutch and brake operating member 528. The rod 520 is also connected by a link 529 with the lever 530 of the gas valve 305 to close same when operated to release the clutch 501 (Figs. 4 and 29).

The lever 523 is also operably connected with a solenoid 531 through a pin and slot connection 532 with the shiftable core 533 of the solenoid which is energized to operate the lever and cause release of the clutch 501 and application of the brake 519 to stop operation of the machine through switching means actuated upon the breaking of either one of the releasable connections G or H associated with the conveyor driving shafts 15 and 45, or upon failure of either one of the tray locks 480 or 480a to lock or release the trays at the proper instant, or when the conveyor drive chain 48 breaks or is excessively tensioned due to other abnormal functioning of the parts.

Said switching means includes (Figs. 10, 12 and 32) a pair of spring pressed contacts 536 and a bridging contact plate 537 carried by the arm 17e and gear 17d, or sprocket 46, of each releasable connection G and H, whereby upon relative movement between the arm and gear or sprocket, caused by release of the detent 17j the contacts will be bridged by the plate 537 and close a power circuit from power lines M to one side of the solenoid by way of conductors 538 and 539 and a commutator 540 interposed therein and carried on the hub of the arm 17e, the other side of the solenoid being connected to the power lines by a conductor 541.

Another form of switch for the releasable connections is shown in Fig. 13a. In this form, the torque transmitting adjustable screw 17f of the arm 17e may be replaced by a spring pressed plunger 542 having a stem 543 on whose bottom end is a bridging contact plate 544 which, in the event abnormal torque is transmitted to the plunger and same is depressed, will bridge contacts 545 substituted for the contacts 536. The plunger 542 may be supported in a spring barrel 546 threaded in a lug 17g of the arm 17e for adjustment, with a spring 547 therein acting on the plunger and backed up by an adjustable bearing 548 supporting the plunger stem and threaded in the barrel to regulate compression of the spring in regulating the torque value at which the plunger will be depressed. The contacts 545 may be supported on a bracket extension 549 of the spring barrel 546. The detent 17j and arm 17h may be retained in connection with the plunger 542 or the arm may be replaced by a suitable lug 550 on the gear 17d or sprocket 46 for engaging the plunger 542 as seen in dot and dash lines in Figs. 12 and 13a.

Another form of switching means for the releasable connections is shown in Fig. 13, wherein the detent 17j is provided with a stem 556 extending through the end plug 17n with a bridging contact plate 557 on its end which, upon release of the detent, will bridge contacts 558 substituted for the contacts 536 and carried on a bracket 559 of the lever 17h.

When the chain 48 is excessively tensioned, the circuit to the solenoid 531 is closed by a mercury tube switch 563 carried on the bellcrank 49a and interposed between conductors 538 and 539 (Figs. 6, 6a and 32). When the chain 48 breaks, circuit to the solenoid is closed through a mercury tube switch 564 interposed between said conductors 538—539 and carried on a lever 565 normally held raised about its pivot, with said switch opened, by having a roller 566 engaging over the chain, and whereby the lever will fall to tilt the switch to closed position as the chain breaks.

When either one of the tray locking bars 480 and 480a fails to raise into locking position at the proper time, circuit to the solenoid will be closed through a mercury tube switch 569 tilted to closed position by the bar, and a mercury tube switch 570 tilted to closed position by a cam 571 acting on a lever 572 carrying the switch, said switches being connected in series between the conductors 538 and 539. When either locking bar fails to retract from its locking position at the proper time, circuit to the solenoid will be closed through a mercury tube switch 573 tilted to closed position by the bar, and a mercury tube switch 574 arranged on the lever 572 to be tilted to closed position by the cam 571, said switches being connected in series between the conductors 538 and 539.

The switches 569 and 573 associated with each locking bar are mounted on a lever 575 connected by a link 576 with the bellcrank 483 of the bar whereby during normal operation of the bar said switches will be opened and closed alternately while their co-operating switches 570 and 574 are closed and opened alternately so that energization of the solenoid will not be established.

The main motor 498 for driving the shaft 16 is energized by the power lines M through conductors 583 controlled by an electrically actuated switch 584 operated through a commercial push-button switch 585 through conductors 586. An air pressure actuated switch 589 in line 103 and interposed in a conductor 586 opens the motor switch to stop the machine in the event air pressure in the line drops below a value predetermined to effect proper operation of the various air pressure operated devices of the system (Figs. 29 and 32).

The motor 58 for driving the blower 57 for the cleaner nozzles 55 is energized by the power lines M through conductors 593 controlled by an electrically actuated switch 594 controlled by the main switch 584 to open and close therewith through conductors 595 (Fig. 32).

The motor 392 for rotating the chucks of the jigger station is energized from the main power lines M by way of conductors 599 controlled by an electrically actuated switch 600 controlled by a push-button switch 601 through conductors 602. In one of the conductors 602 is a vacuum actuated switch 603 connected with the main vacuum line 473 to open the jigger motor switch and stop rotation of the chucks in the event vacuum in the line has decreased below a value predetermined to maintain the molds firmly in the press and jigger chucks during operation of the machine (Figs. 29 and 32).

*Signal system*

An automatic signal system is provided in connection with the dryer to signal attendants whether or not the dryer is maintained heated to the proper temperature in various zones therealong so that overheating of the dryer and burning of the ware may be prevented. Said system includes an electric lamp 606 of any distinguishing color, such as red, and an electric sounding device or bell 607 which are simultaneously energized from the power lines M through the closing of any one or more of a series of thermo-actuated switches 608 disposed in the dryer at spaced intervals therealong and arranged to close under the influence of abnormal temperature therein.

The thermo-actuated switches establish connection between one side of the power lines and one side of the lamp 606 and bell 607 through conductors 609 and 610, between which the switches are interposed in parallel, the other side of the lamp and bell being connected with the other side of the power lines through a conductor 611. Connected between the conductors 609 and 611 adjacent the power lines may be an electric signal lamp 612, of any distinguishing color, such as green, adapted to be constantly energized to indicate that power to the bell and red lamp is maintained.

In the power lines M between the signal system and motor switches may be a main circuit breaker 613 so that operation of the machine may be stopped without interfering with the operation of the signal system.

*Dryer air control*

While any type of dryer air control may be employed, that generally disclosed in Figs. 1 and 2 may include a multiple of individually controlled blowers 616 connected with openings spaced along each side of the dryer and provided with heating members 617 through which kiln air is selectively directed into the dryer.

Another form is illustrated in Fig. 36 and includes an air circulating system characteristic of that disclosed and claimed in my Patent No. 2,046,525, whereby the molds as well as the ware will be more uniformly dried. To this end, the upwardly and downwardly moving stretches of the conveyor in the dryer are disposed between baffles 620 and 621 forming with the bottom wall of the dryer and bottom wall of a chamber 622 in the top part of the dryer, interconnected vertical duct sections 623 through which the trays of molds are conveyed. At certain upper junctions of the ducts 623, heated air from the chamber 622 is blown therein by way of blowers 624 whose outlets connect with said junctions whereby the heated air will be forcefully circulated through certain ducts with movement of the conveyor and through others against the movement of the conveyor and then returned to the member 622 by way of upper junctions of intermediate ducts which open, as at 625, into the chamber. In said junction openings are arranged thermostatically controlled heating elements 626 for heating the air to optimum degree as it returns to the air chamber 622. The heated air flowing in the ducts 623 is deflected against the mold bottoms and the ware on the molds in swirls and cross currents by the trays and also by a series of deflectors 627 on the walls of the ducts, thereby more uniformly and efficiently drying the ware and molds.

As the heated air flows from the open junctions of the ducts into the air chamber 622, a greater percentage thereof is allowed to flow in the direction of the ware receiving end of the dryer than in the opposite direction by means of butterfly dampers 628 arranged in the chamber and controlled by humidostats (not shown) so that air circulation in the dryer at its ware receiving end will be more humid than that circulated at its ware discharge end to cause a more rapid drying of the ware after the critical shrinkage period of the ware has been completed. As the more humid air gradually progresses in the air chamber 622, it is exhausted through one or more exhaust ports 629 along the length of the chamber, while a fresh supply of heated dry air, or of optimum humidity, may be constantly supplied into the other end of the chamber, and/or along the length thereof, from any suitable source, such as that adjacent the heating chamber of a kiln, by way of a conduit 630.

While the cam disc 196 (Figs. 18, 19 and 20) and the others similar thereto mounted on the cam shaft 166 (Figs. 22 and 23) have adjustable means for varying the sequence of operation thereof, it is contemplated to provide each with a vernier adjustment that may be self locking to enable greater precision, and expeditiously adjusted without interrupting production of the ware. Each cam disc may be connected with the cam shaft 166 through a spur-gear segment 633 secured on the shaft and a spring pressed bifurcated arm 634 pivoted on one side of the cam disc, as at 635, and having spaced bearings 636 supporting spaced trunnions 637 connected by dual opposed locking pins 838 normally held resiliently engaged by spring 639 at opposite sides of a tooth of the gear segment in locking connection therewith. Angular adjustment of the cam disc is effected by rotation of the trunnions 637 by means of a crank 640 connected therewith, whereby the pins 638 will walk along the teeth of the gear segment as they alternately serve as a pivot for each other in shifting the cam disc angularly with respect to the gear segment. After the adjustment has been made, the cam disc may be clamped to the cam shaft 166 through a split hub 641 thereon clamped by a bolt 642, or the disc may be solely connected with the shaft through the gear segment so that adjustment may be made while the machine is in operation, as flipping of the crank 639 to actuate the locking pins 638 may be easily accomplished while the disc is slowly rotating at normal speed. When both locking pins are held in normal locking engagement with the gear segment by the spring pressed arm, the common axis of the trunnions 637 intersects the pitch line of the gear teeth of the segment, whereby no angular motion can be imparted to the trunnions by the gear, as seen in Fig. 20a.

What I claim is:

1. In combination, fluid pressure operated clay charge feeding means, means for conveying a succession of molds into and out of cooperative relation with the feeding means, a source of fluid pressure for said pressure operated means, and control means responsive to a decrease in pressure of said source below a predetermined value for rendering the conveying means inoperative.

2. The combination with a fabricating device, a conveyor having mold stands arranged to be brought into and out of co-operative registration with the device and operating means for operating the device and conveyor, of locking means for locking the stands in co-operative registration with the device and control means controlled by the locking means upon failure of the stands to register with the fabricating device for rendering the operating means inoperative.

3. The combination with a fabricating device, a conveyor having mold stands arranged to be brought into and out of co-operative relation with the device, and operating means for operating the device and conveyor in timed relation, of locking means controlled by the device for locking the stands in co-operative relation with the device and control means controlled by the locking means upon failure of the device and conveyor to operate in timed relation for rendering the operating means inoperative.

4. The structure as defined in claim 3, wherein the last means includes electrically operated means for rendering same effective and including a power circuit therefor, and a pair of switches arranged in series in said circuit and controlled by the crosshead and operating means, respectively.

5. In combination, driven pottery ware fabricating apparatus, a driven conveyor for conveying molds into and out of co-operative relation with the fabricating apparatus, a driving device, a releasable clutch for connecting the device with the apparatus to drive same, a releasable coupling connecting the device with the conveyor to drive same and adapted to release when the driving force requirement thereof exceeds a predetermined value and means connecting the clutch with the coupling to release the clutch upon release of the coupling.

6. In combination, a fabricating device, an intermittently operated mold conveyor for intermittently advancing molds into and out of co-operative registration with the device, operating means for the device and conveyor, and control means operative upon failure of molds to properly register with the device for rendering the operating means inoperative said last means including electrically operated means for rendering same effective, and a locking device operative between movements of the conveyor to lock same in position and controlling the energization of said electrically operated means.

7. In combination, a fabricating device, an intermittently operated mold conveyor for intermittently advancing molds into and out of cooperative registration with the device, operating means for the device and conveyor, and control means operative upon failure of molds to properly register with the device for rendering the operating means inoperative said last means including electrically operated means for rendering same effective, and having a power circuit therefor, a switch in said circuit, and a locking device operative between movements of the conveyor to lock same in position and controlling the operation of the switch.

8. In combination, driven pottery ware fabricating apparatus, a driven conveyor for conveying molds into and out of cooperative relation with the fabricating apparatus, a driving device, a releasable clutch for connecting the device with the apparatus to drive same, a releasable coupling connecting the device with the conveyor to drive same and adapted to release when the driving force requirement thereof exceeds a predetermined value and means connecting the clutch with the coupling to release the clutch upon release of the coupling said last means including electrically operated means to release the clutch and having a circuit therefor, and a switch included in said circuit and controlled by said coupling.

9. In combination, an intermittently operated pottery ware fabricating device, an intermittently advanced conveyor for intermittently advancing molds into and out of co-operative relation with the machine including means for driving the conveyor comprising a Geneva motion, a releasable coupling cooperating between the same and the conveyor to release when the driving force requirement of the motion exceeds a predetermined value for operating the machine, and control means actuated upon release of the coupling for rendering the operating means inoperative.

WILLIAM J. MILLER.

REFERENCES CITED

The following references are of record in the file of this patent:

UNITED STATES PATENTS

| Number | Name | Date |
|---|---|---|
| 1,322,813 | Parker | Nov. 25, 1919 |
| 1,408,663 | Wainford et al. | Mar. 7, 1922 |
| 1,693,765 | Parsons et al. | Dec. 4, 1928 |
| 1,849,272 | Bown | Mar. 15, 1932 |
| 2,046,525 | Miller | July 7, 1936 |
| 2,109,028 | Miller | Feb. 22, 1938 |
| 2,114,254 | Miller et al. | Apr. 12, 1938 |
| 2,139,362 | Getty | Dec. 6, 1938 |
| 2,180,895 | Doll et al. | Nov. 21, 1939 |
| 2,258,658 | Miller | Oct. 14, 1941 |
| 2,303,887 | Miller | Dec. 1, 1942 |
| 2,313,056 | Emerson et al. | Mar. 9, 1943 |

Certificate of Correction

Patent No. 2,499,602                                                    March 7, 1950

WILLIAM J. MILLER

It is hereby certified that errors appear in the printed specification of the above numbered patent requiring correction as follows:

Column 7, line 67, for "rod" read *rod 76*; column 14, line 22, for "crosshead 341" read *crosshead 241*; line 60, after the word "flat" insert *ware*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*